(12) United States Patent
Gruden

(10) Patent No.: US 9,257,888 B2
(45) Date of Patent: Feb. 9, 2016

(54) ROTARY SOLENOID

(71) Applicant: JOHNSON ELECTRIC S.A., Murten (CH)

(72) Inventor: James M. Gruden, Centerville, OH (US)

(73) Assignee: JOHNSON ELECTRIC S.A., Murten (CH)

( * ) Notice: Subject to any disclaimer, the term of this patent is extended or adjusted under 35 U.S.C. 154(b) by 0 days.

(21) Appl. No.: 14/108,791

(22) Filed: Dec. 17, 2013

(65) Prior Publication Data

US 2014/0218143 A1    Aug. 7, 2014

Related U.S. Application Data

(60) Provisional application No. 61/758,120, filed on Jan. 29, 2013.

(51) Int. Cl.
*H02K 33/02* (2006.01)
*H02K 5/04* (2006.01)
*H02K 15/02* (2006.01)
*H02K 33/16* (2006.01)
*H02K 26/00* (2006.01)

(52) U.S. Cl.
CPC ............... *H02K 15/022* (2013.01); *H02K 5/04* (2013.01); *H02K 26/00* (2013.01); *H02K 33/02* (2013.01); *H02K 33/16* (2013.01); *Y10T 29/49009* (2015.01)

(58) Field of Classification Search
CPC ................... H01F 7/145; H02K 33/00–33/18; H02K 5/04
USPC ...................................... 335/272; 310/36, 38
See application file for complete search history.

(56) References Cited

U.S. PATENT DOCUMENTS

| | | | | |
|---|---|---|---|---|
| 3,435,394 | A * | 3/1969 | Egger | 335/272 |
| 4,510,403 | A * | 4/1985 | Vanderlaan et al. | 310/36 |
| 2013/0076185 | A1 | 3/2013 | Benner, Jr. | |
| 2013/0076194 | A1 | 3/2013 | Benner, Jr. | |
| 2013/0181549 | A1 | 7/2013 | Benner, Jr. | |

* cited by examiner

*Primary Examiner* — Ramon M Barrera
(74) *Attorney, Agent, or Firm* — Nixon & Vanderhye, P.C.

(57) ABSTRACT

In one of its aspects the technology disclosed herein concerns a process of making a rotary solenoid. In a generic mode, the process comprises fitting together two mating core half members (22A, 22B) of a stator until two respective pole faces (32A, 32B) of the two mating core half members (22A, 22B) press to a positive stop against a precision diameter pin positioned between the two mating core half members and so that the two mating core half members interlock at the positive stop. The process further comprises removing the precision diameter pin to provide an axially extending space comprising a predetermined distance between the two respective pole faces (32A, 32B). The process further comprises inserting a rotor (26) within the axially extending space. The process further comprises fitting the two mating core half members (22A, 22B) and the rotor (26) between the two opposing end caps (20, 30). The act of fitting the two mating core half members and the rotor between the two opposing end caps preferably comprises aligning the two pole faces (32A, 32B) with pole face alignment features provided on the two opposing end caps whereby the two pole faces are retained at a predetermined position relative to the rotor.

21 Claims, 23 Drawing Sheets

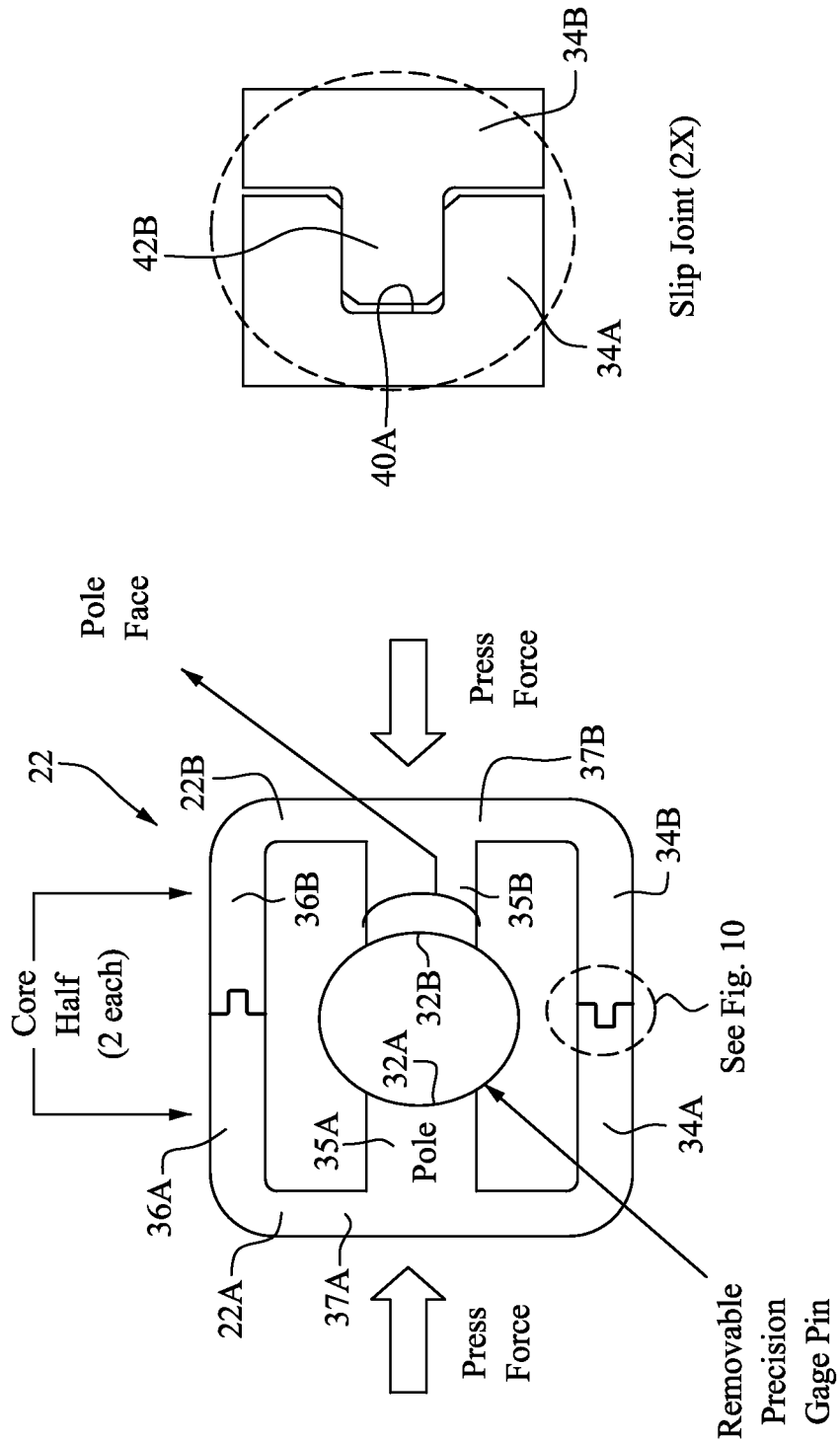

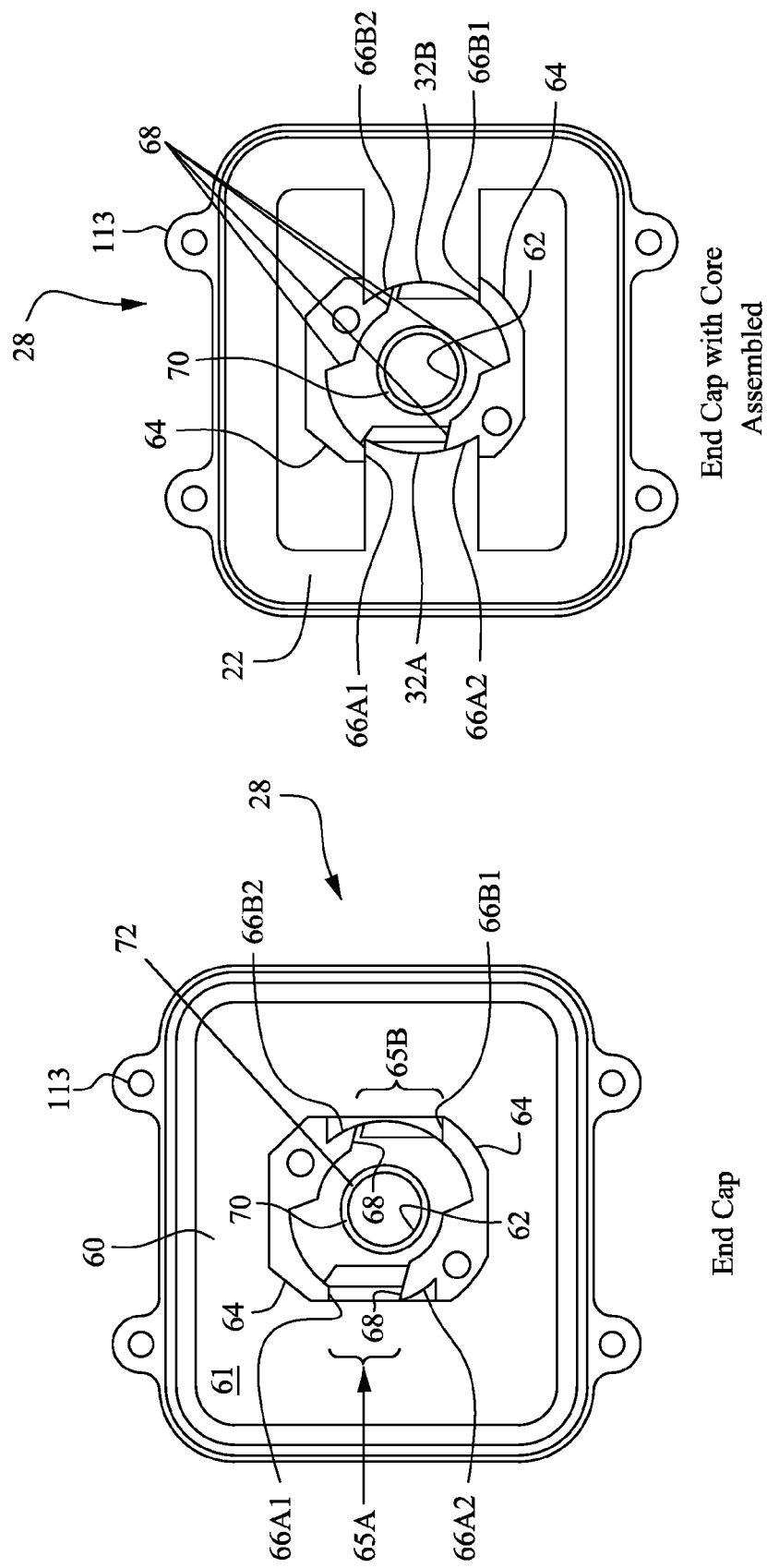

Clockwise Rotation

Counterclockwise Rotation

ROTARY SOLENOID

This application claims the priority and benefit of U.S. Provisional Patent Application 61/758,120, filed Jan. 29, 2013, entitled "Rotary Solenoid", which is expressly incorporated herein by reference in its entirety.

TECHNICAL FIELD

The technology relates to solenoids, and particularly to a rotary solenoid.

BACKGROUND

Typical high power, extended life rotary solenoids are expensive due to numerous and detailed components, costly bearings and complex manufacturing schemes. Extended life rotary solenoids can perform for 100+ million cycles and sustain high power levels due to their all-metal construction that transmits heat to the surrounding environment. While some solenoid applications warrant the high price for these rotary solenoids, there is also a large market segment that desires a much less expensive rotary solenoid with reduced cycle life and less power. One option to accomplish this scenario is to choose a very inexpensive commodity linear solenoid and combine it with a mechanism that converts the linear motion into rotary motion. However, this combination approach typically results in an overall assembly that costs more than desired and is also suspect to numerous quality issues.

What is needed is a low-cost, direct rotary motion solenoid that provides millions of life cycles at a reduced power level.

SUMMARY

In one of its aspects the technology disclosed herein concerns a process of making a rotary solenoid. In a generic mode, the process comprises fitting together two mating core half members of a stator until two respective pole faces of the two mating core half members press to a positive stop against a precision diameter pin positioned between the two mating core half members and so that the two mating core half members interlock at the positive stop. The process further comprises removing the precision diameter pin to provide an axially extending space comprising a predetermined distance between the two respective pole faces. The process further comprises inserting a rotor within the axially extending space. The process further comprises fitting the two mating core half members and the rotor between the two opposing end caps. The act of fitting the two mating core half members and the rotor between the two opposing end caps preferably comprises aligning the two pole faces with pole face alignment features provided on the two opposing end caps whereby the two pole faces are retained at a predetermined position relative to the rotor.

In an example implementation, the generic process further comprises fitting the two mating core half members of the core around pole face alignment features provided on the top end cap. The process further comprises positioning the top end cap over the two mating core half members and inserting a top end of a shaft of the rotor into an aperture in the top end cap. The process further comprises positioning the bottom end cap to the two mating core half members and thereby (1) axially positioning at least a portion of the rotor between the top end cap and the bottom end cap; and (2) aligning the pole face alignment features provided on the top end cap with the pole face alignment features provided on the bottom end cap. Positioning of the bottom end cap results in the two pole faces being disposed in respective pole face windows formed by alignment of the pole face alignment features provided on the bottom end cap and the pole face alignment features provided on the top end cap, and accurate axially positioning at least a portion of the rotor between the top end cap and the bottom end cap.

In another of its aspects the technology disclosed herein concerns rotary solenoids made by the processes described herein.

In another of its aspects the technology disclosed herein concerns a rotary solenoid comprising a core, a shaft, a rotor, and two end caps. The core comprises two electromagnet poles which terminate in two respective pole faces. The rotor is mounted on the shaft. The two end caps are mounted to the core with the shaft extending through the end caps for rotational motion relative to the pole faces in accordance with energization of the two electromagnetic poles. At least one and preferably both of the end caps comprise a cover member and an axial wall. The cover member comprises an aperture through which the shaft extends. The axial wall extends from the cover member in a direction of a shaft axis and is configured to provide a feature which aligns the two pole faces with the aperture in the cover member for self-aligning the two pole faces with an outer diameter of the rotor. In an example implementation the wall is further configured to provide both end-of-travel stop surfaces for the rotor and a bearing surface for the shaft.

In another of its aspects the technology disclosed herein concerns a rotary solenoid comprising a core, a shaft, a rotor, and two end caps. The core comprises two electromagnet poles which terminate in two respective pole faces. The rotor is mounted on the shaft. The two end caps are mounted to the core with the shaft extending through the end caps for rotational motion relative to the pole faces in accordance with energization of the two electromagnetic poles. At least one and preferably both of the end caps comprise a cover member and an axial wall. The cover member comprises an aperture through which the shaft extends. The axial wall extends from the cover member in a direction of a shaft axis and is configured to provide one or more end-of-travel stop surfaces for the rotor.

In an example embodiment, the rotary solenoid comprises both a first end cap and a second end cap. The first end cap comprises a first end cap cover member comprising a first end cap aperture through which the shaft extends and a first end cap wall. The first end cap wall extends from the first end cap cover member in a direction of a shaft axis and is configured to provide a first end cap feature (which aligns the two pole faces with the aperture in the first end cap cover member for self-aligning the two pole faces with an outer diameter of the rotor) and to provide both end-of-travel stop surfaces for the rotor. The second end cap comprises a second end cap cover member and a second end cap wall. The second end cap wall comprises a second end cap aperture through which the shaft extends. The second end cap wall extends from the second end cap cover member in a direction of a shaft axis and is configured to provide a second end cap feature (which aligns the two pole faces with the aperture in the second end cap cover member for self-aligning the two pole faces with an outer diameter of the rotor) and to provide both end-of-travel stop surfaces for the rotor.

In an example embodiment at least one of the two end caps comprises a plastic material and the aperture of the at least one end cap serves as a plastic bearing for the shaft.

In an example embodiment at least one of the end caps comprises a channel formed to accommodate ball bearings to support the shaft.

In an example embodiment the cover member and the wall are integrally formed of plastic.

In an example embodiment the cover member is metallic and the wall comprises a plastic wall insert member that attaches to an interior surface of the cover member, the plastic wall insert comprising a second aperture which provides a bearing surface for the shaft and thrust ring surfaces for the rotor.

In another of its aspects the technology disclosed herein concerns a rotary solenoid comprising a core, a shaft, a rotor, and two end caps. The core comprises two electromagnet poles which terminate in two respective pole faces. The rotor is mounted on the shaft. The two end caps are mounted to the core with the shaft extending through the end caps for rotational motion relative to the pole faces in accordance with energization of the two electromagnetic poles. One of the two end caps comprises an anchor feature. A torsion spring is configured to return the shaft to a home position when the two magnetic poles are not energized. The torsion spring comprises a coil which terminates in a torsion spring first end and a torsion spring second end, the torsion spring first end being configured for engagement with the anchor feature. A spring holder is attached to the shaft. The spring holder comprises a holder body about which the coil of the torsion spring makes at least one turn. The spring holder further comprises a set point for retaining the torsion spring second end. The spring holder body is configured with an enlarged lobe to preclude removal of the torsion spring along a direction of the shaft axis after the torsion spring is set.

In another of its aspects the technology disclosed herein concerns a rotary solenoid comprising a core, a rotor assembly, and two end caps. The core comprises two electromagnet poles which terminate in two respective pole faces. The rotor assembly comprises a shaft; a magnetic rotor carried by the shaft and configured to be accommodated between the two pole faces; and, a retainer configured to retain the magnetic rotor on the shaft. The two end caps are mounted to the core with the shaft extending through the end caps for rotational motion relative to the pole faces in accordance with energization of the two electromagnetic poles.

In an example implementation, the shaft comprises a stepped portion; the magnetic rotor comprises a through hole configured to receive the shaft so that the magnetic rotor abuts the shaft stepped portion; and the magnet retainer is configured to fit over the shaft and to prevent the magnetic rotor from angular motion relative to the shaft.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

FIG. 9 is a diagrammatic view showing an act of assembling the rotary solenoid of FIG. 1.

FIG. 10 is a diagrammatic view showing an enlargement of a slip joint of the rotary solenoid of FIG. 1.

FIG. 11 is a bottom view of a top end cap of the rotary solenoid of FIG. 1.

FIG. 12 is a bottom view of the top end cap of the rotary solenoid of FIG. 1 also showing placement of a solenoid core.

DETAILED DESCRIPTION

Figure 1:
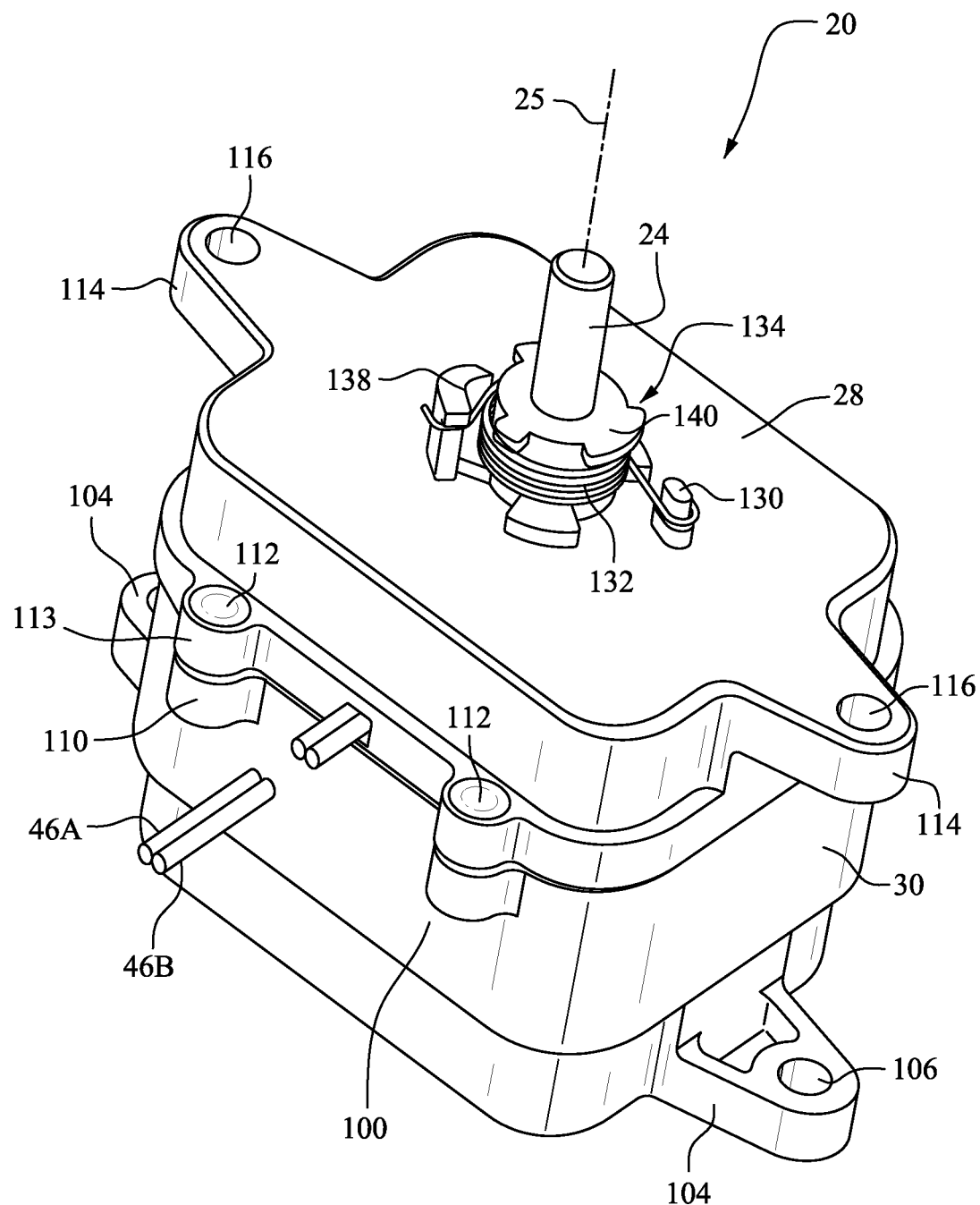
FIG. 1 is a left front perspective view of a rotary solenoid according to an example embodiment.
Figure 2:
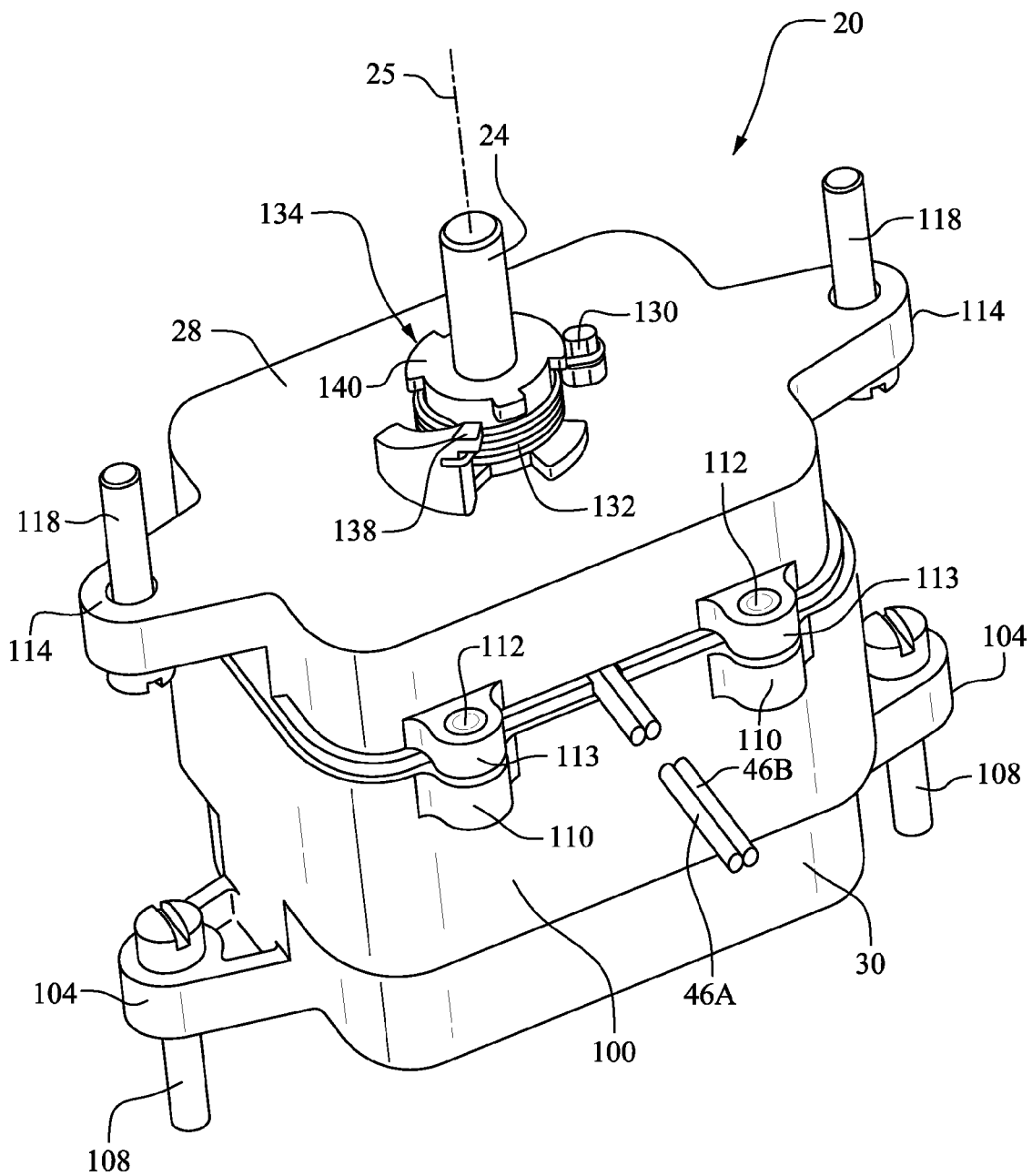
FIG. 2 is a perspective view of a rotary solenoid according to the example of FIG. 1, rotated ninety degrees, and additionally showing four fasteners.
Figure 3:
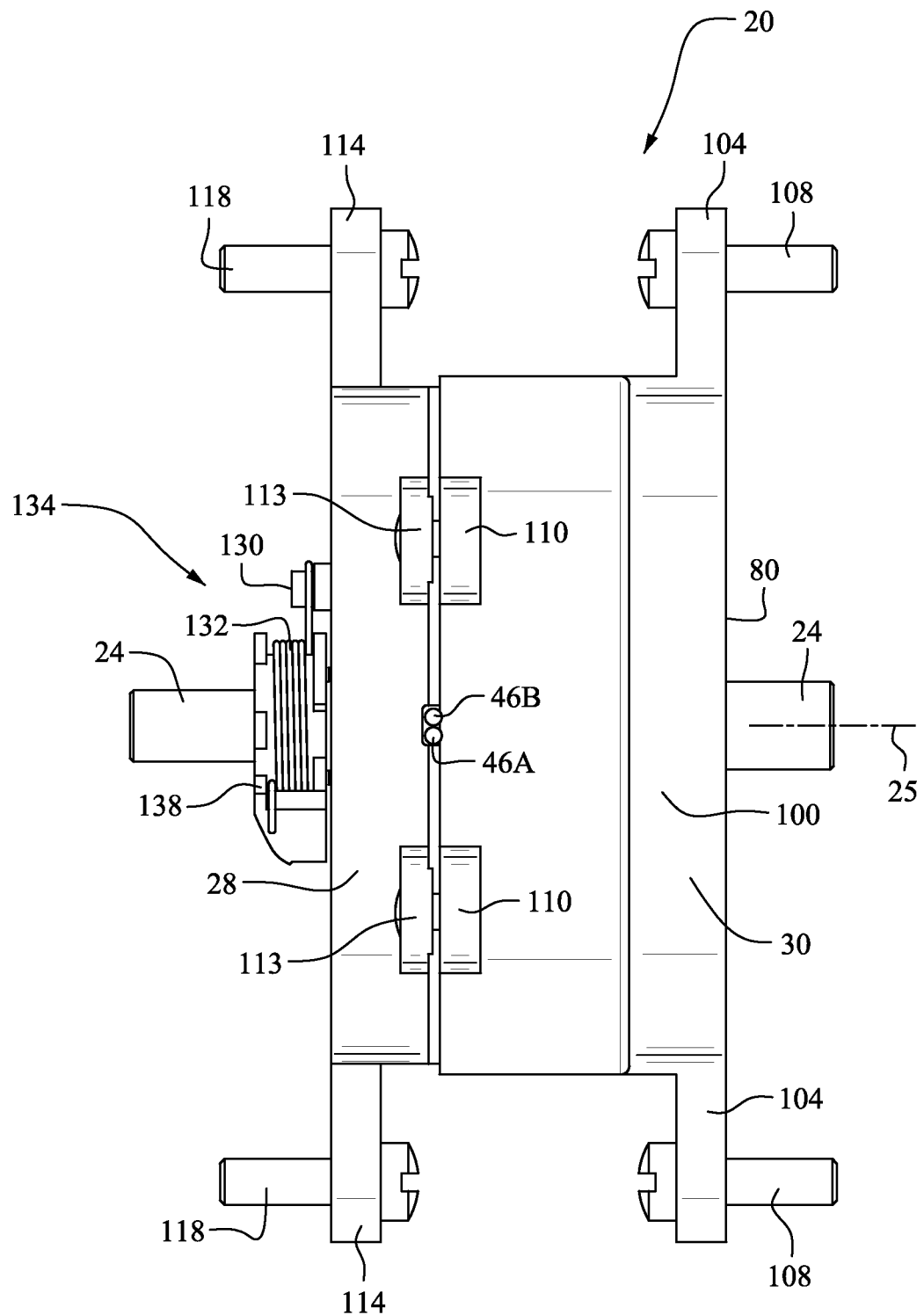
FIG. 3 is a side view of the rotary solenoid of FIG. 2.
Figure 4:
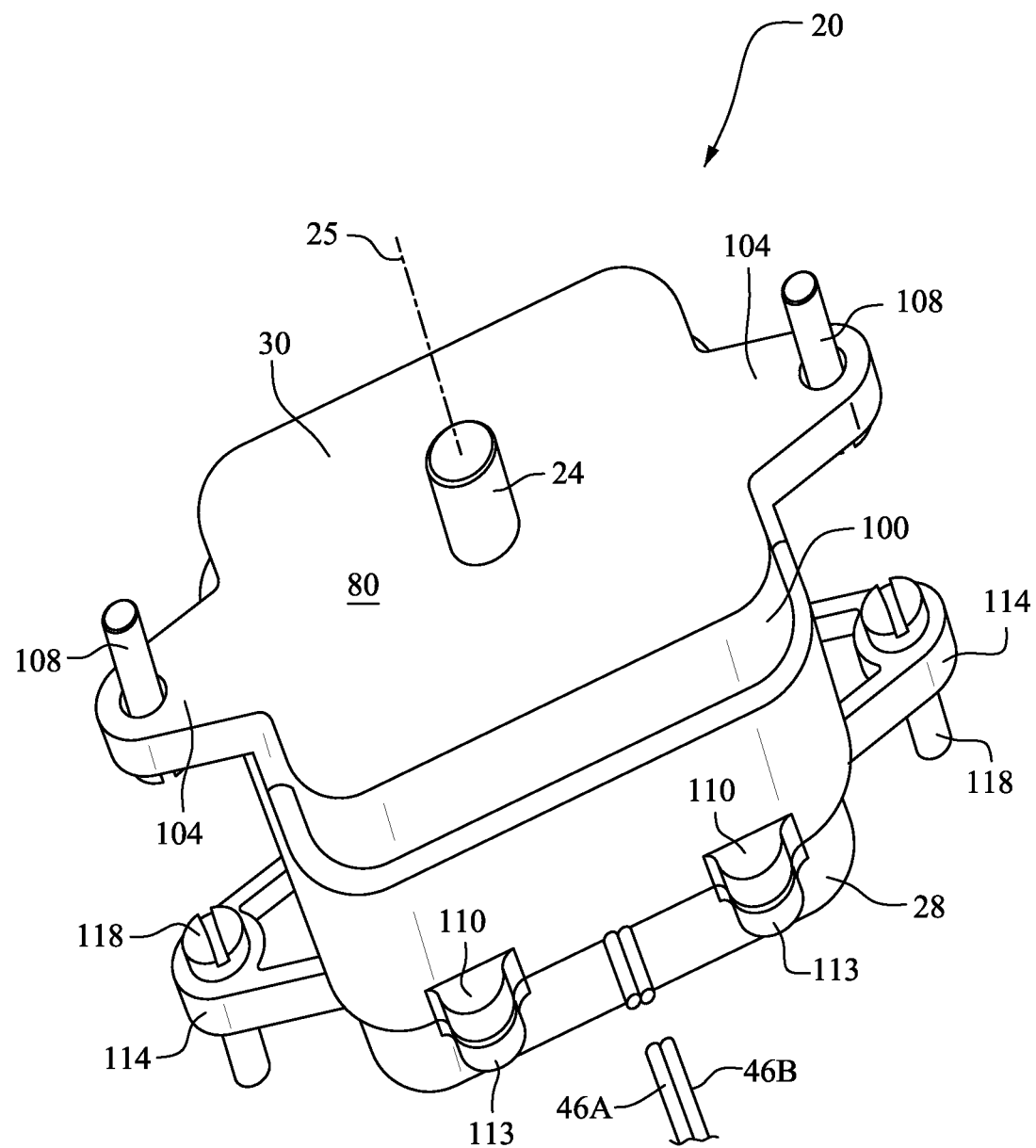
FIG. 4 is a bottom perspective view of the rotary solenoid of FIG. 2.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

FIG. 1-FIG. 6 illustrate, from differing vantage points and in differing views, an example embodiment of an easily assembled rotary solenoid 20. As perhaps best shown in FIG. 6, in basic, generic form rotary solenoid 20 comprises solenoid core 22; rotor assembly 23 (which, in turn, comprises shaft 24 which rotates about rotor axis 25 and rotor 26); and two end caps 28 and 30 (e.g., top end cap 28 and bottom end cap 30). As used throughout this description, "axial" or "axis" or "axially" refers to the axis 25 of shaft 24.

The core 22 comprises two electromagnet poles which terminate in two respective pole faces 32A and 32B. In particular, core 22 comprises two mating core half members 22A and 22B which are press fit together into interlocking relationship to define a predetermined distance between two pole faces 32A and 32B, respectively. The core half members 22A and 22B are preferably formed of steel, either as solid steel or layers of laminations. In an example implementation, in a plane perpendicular to rotor axis 25 each of the two core half members essentially have an "E" shape comprising three parallel branch segments 34, 35, and 36. The three parallel branch segments 34, 35, and 36 are each perpendicular to core main segment 37 to which the three branch segments 34, 35, and 36 connect.

Figure 6:
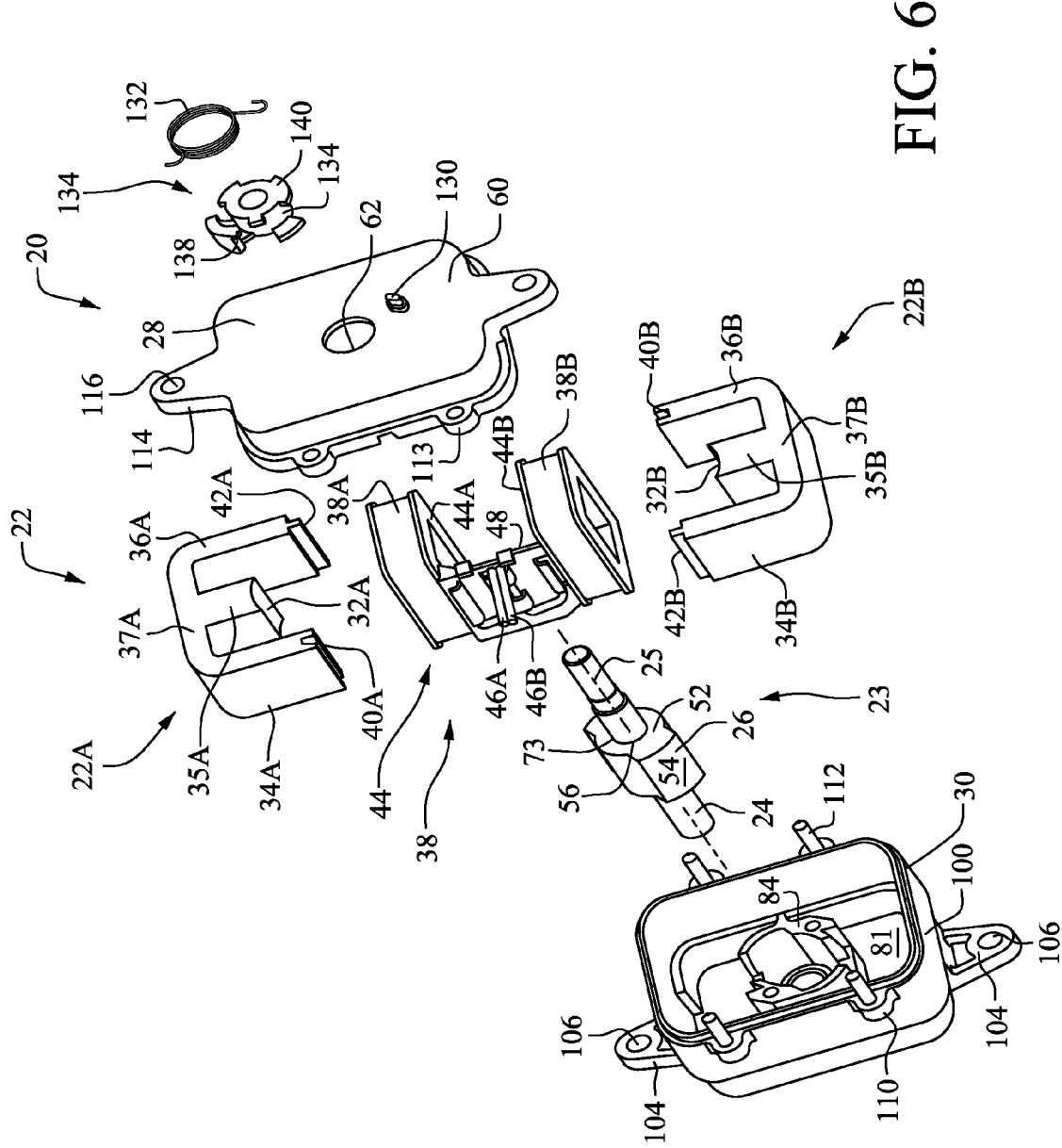
FIG. 6 is an exploded perspective view of the rotary solenoid of FIG. 1.
Figure 8:
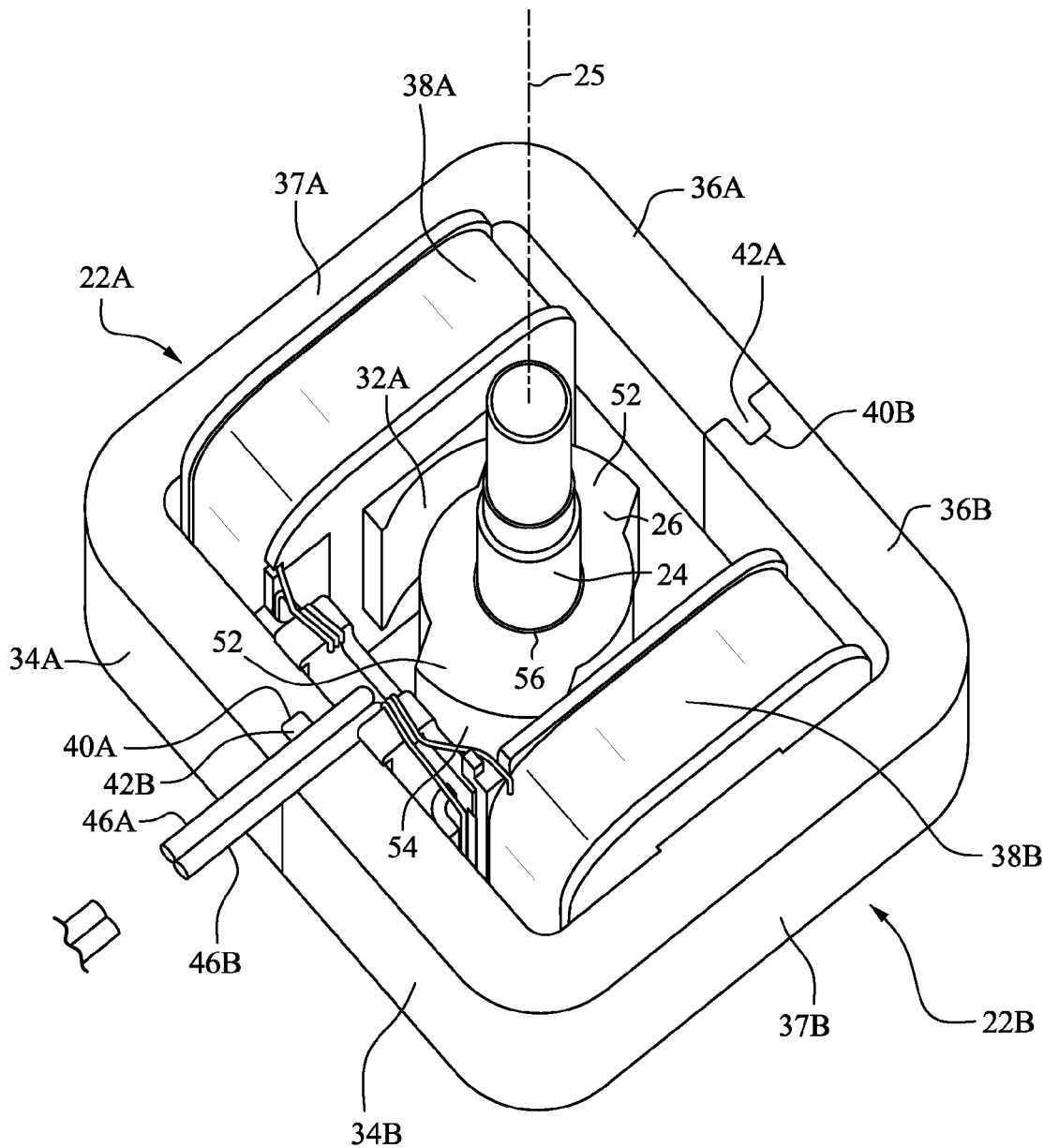
FIG. 8 is a top, side perspective view of a portion of the rotary solenoid of FIG. 1.

For each core half member 22A, 22B a center one of the branch segments (segment 35) forms the pole, and as such has a portion of a coil of coil assembly 38 wrapped thereabout. As illustrated in FIG. 6, FIG. 8, and in more detail in FIG. 10, the outer, non-center, or extreme ones of the branch segments (segments 34 and 36) are configured for slip joint mating (tongue and groove mating) with another core half member. For example, outer segment 34A of core half member 22A has groove 40A formed therein to extend in a direction parallel to axis 25. A mating outer segment 34B of core half member 22B has tongue 42B formed thereon, also to extend in a direction parallel to axis 25, and sized for a slip joint (press) fit into the corresponding groove 40A of the mating core half member 22A. Essentially the same, or essentially similar type of slip joint (press fit) exists with respect to the other outer segments 36A and 36B, with either one of outer segments 36A and 36B being grooved and the other tongued, but preferably with each mating core half member 22 having one grooved outer segment and one tongued outer segment, as illustrated in FIG. 6 and FIG. 8. The person skilled in the art appreciates that alternate interlocking configurations are also possible.

As shown in FIG. 6, coil assembly 38 comprises coil half windings 38A which encircle central core segment 35A of core mating half 22A and coil half windings 38B which encircle central core segment 35B of core mating half 22B. The coil assembly 38 comprises two wound coils 38A and 38B, but these two wound coils 38A and 38B are electrically connected to each other so there is only one path for current to flow and that is through both coils 38A and 38B. For that reason the coil windings 38A and 38B are also referred to as coil half windings. The pole faces 32A and 32B become electromagnetic when current flows through the coil half windings 38A and 38B, respectively. The windings 38A and 38B are supported, e.g., wound around, bobbin 44, and in particular bobbin half segments 44A and 44B, respectively, sized to fit over the respective central core segments 35A and 35B. Electrical leads 46A, 46B are provided for applying electrical current to the coil windings 38A and coil windings 38B, respectively. Only one lead is attached to each coil winding 38A, 38B, but ultimately current flows in series through the entire coil assembly. The bobbin half segments 44A and 44B with their respective coil half windings 38A and 38B are held in spaced-apart relation and their respective leads 46A, 46B carried by bobbin connector member 48. Preferably bobbin half segments 44A, 44B, and bobbin connector member 48 are integrally molded/shaped.

Figure 7:
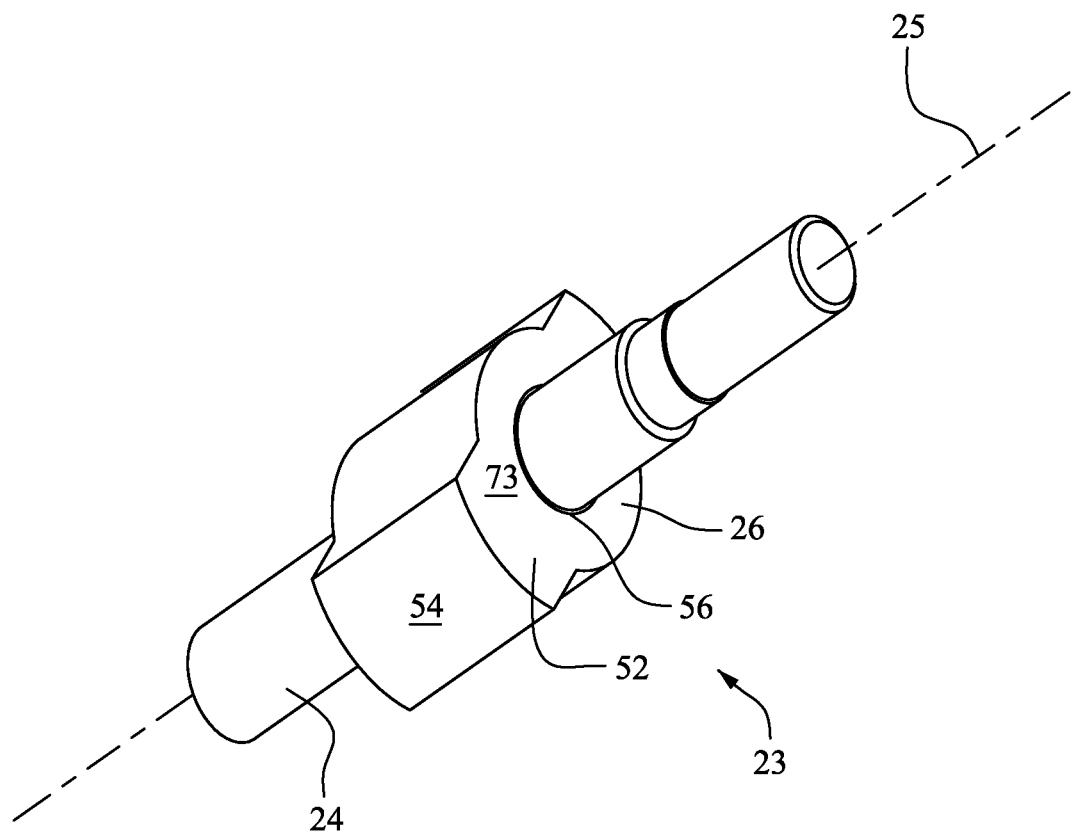
FIG. 7 is a side perspective view of a rotor assembly of the rotary solenoid of FIG. 1.

As mentioned above, and more fully illustrated in FIG. 7, the rotor assembly 23 comprises shaft 24 and rotor 26 carried by (e.g., mounted on) the shaft 24. In the example embodiment of FIG. 7, the rotor 26 preferably comprises steel (e.g., either solid steel or layers of laminations). The rotor 26 is configured to be accommodated between the two pole faces 32A and 32B. In the particular example embodiment illustrated, for example in FIG. 8, the rotor 26 has two enlarged portions or rotor lobes 52 which are oriented about rotor axis 25 at 180 degree angles with respect to one another. Terminal faces 54 of the lobes 52 have an essentially same semi-cylindrical configuration as do the two pole faces 32A and 32B. The rotor 26 has rotor central aperture 56 which is press fit over the shaft 24.

The two end caps, e.g., top end cap 28 and bottom end cap 30, are mounted to the core 22. The shaft 24 extends through the end caps 28, 30, for rotational motion of the rotor assembly 23 relative to the pole faces 32A, 32B in accordance with energization of the two electromagnetic poles, e.g., of core segments 35A and 35B, respectively.

At least one and preferably both of the end caps comprise a cover member and two axially-extending walls. The top end cap 28 is also known as the first end cap and as such comprises a first end cap cover wall or member 60, as shown for example in FIG. 11. The first end cap cover wall 60 has an interior surface 61 (see FIG. 11) in which first end cap aperture 62 is centrally formed. The shaft 24 extends through first end cap aperture 62. The top or first end cap 28 also comprises at least one first end cap axial pole face-accommodating wall 64 which extends orthogonally from the first end cap cover wall 60 in a direction of axis 25. The first end cap axial pole face-accommodating wall 64 comprises two pole face windows 65A, 65B in which at least portions of the two pole faces 32A and 32B are disposed and through which at least portions of the two pole faces 32A and 32B are exposed to the rotor 26 when assembled. The provision of the two pole face windows 65 may cause the first end cap axial pole face-accommodating wall 64 to be viewed as separate walls, for which reason the first end cap axial pole face-accommodating wall 64 is sometimes referred to as first end cap axial pole face-accommodating wall(s) 64.

The first end cap axial pole face-accommodating wall(s) 64 provides first end cap pole face alignment features 66. The first end cap pole face alignment features 66A1 and 66A2 serve to align the pole face 32A in pole face window 65A. Similarly, the first end cap pole face alignment features 66B1 and 66B2 serve to align and locate the pole face 32B in pole face window 65B. The face alignment features 66A2 and 66B2 comprise notches or grooves which catch or retain an axially-extending first edge of the respective pole face 32A, 32B. Each first end cap pole face alignment features 66A2 and 66B2 comprises a quasi "V" shaped notch, with one leg of the V being oriented to abut a lateral surface of core segment 35 and another leg of the V being configured as a semi-cylindrical surface to catch a first axial edge of the pole face 32. An end of the semi-cylindrical V shaped surface forms a first axial boundary for the pole face window 65. The face alignment features 66A1 and 66B1, on the other hand, comprise shoulders against which axially-extending second or opposite edges of the respective pole face 32A, 32B may abut, and form a second axial boundary for the pole face window 65. The first end cap pole face alignment features 66 are positioned and configured to align the two pole faces 32A, 32B with the aperture 62 in the first end cap cover wall 60, and as such also serve to self-align the two pole faces 32A, 32B with an outer diameter of the rotor 26, e.g., with the terminal faces 54 of the lobes 52.

The first end cap axial pole face-accommodating wall(s) 64 also provides other features beyond the first end cap pole face alignment feature 66, including end-of-travel stop surfaces 68. One end-of-travel stop surface 68 for each lobe 52 of the rotor 26 is a rotor-oriented face of a projection of the first end cap axial pole face-accommodating wall 64 that is positioned to at least partially conceal an axial edge of a pole face. An essentially adjacent face of the projection that forms the end-of-travel stop surface 68 at least partially defines a first end cap pole face alignment feature 66. Both end-of-travel stop surfaces 68 for lobe 52 of the rotor 26 are configured to abut an essentially entire lateral surface of the lobe 52, e.g., a surface other than face 54 of the lobe 52.

The top or first end cap 28 also comprises first end cap bearing wall 70 which extends orthogonally from the first end cap cover wall 60 in a direction of axis 25. Bearing wall 70 is cylindrical, centered about axis 25, and is essentially concentric with pole face-accommodating wall 64. The bearing wall 70 extends axially and has an inside bearing surface which is essentially flush with an inside surface of the first end cap aperture 62. Bearing wall 70 is thus at a lesser distance from axis 25 than is pole face-accommodating wall 64. An interior surface of bearing wall 70 provides a radial shaft bearing surface. At its axial termination bearing wall 70 provides a rotor thrust surface 72. The rotor thrust ring surface 72, also known as the rotor thrust surface, engages a surface 73 of a terminal end of the rotor (see FIG. 6 and FIG. 7) and prevents the rotor assembly from moving too far in the axial direction. The shaft radial bearing surface and the thrust surface 72 of bearing wall 70 are further understood with reference to comparable features of an embodiment illustrated in FIG. 20, with FIG. 20D providing an illustration of the thrust surface 72.

The bottom end cap 30, also known as the second end cap, has similar structure as the top end cap 28 but has greater extent in the direction of axis 25. The bottom end cap 30 comprises second end cap cover wall or member 80 (see, e.g., FIG. 3 and FIG. 4). The second end cap cover wall 80 has an interior surface 81 (see FIG. 6 and FIG. 13) in which second end cap aperture 82 is centrally formed (see FIG. 13 and FIG. 14). The second end cap aperture 82 is sized and positioned for a base end of shaft 24 to extend therethrough. An axially-extending hollow cylindrical shaft-holding base 83 is formed on interior surface 81 around second end cap aperture 82 to provide radial bearing support for shaft 24 in the radial direction.

The bottom end cap 30 also comprises second end cap axial pole face-accommodating wall 84 which extends orthogonally from the second end cap cover wall 80 in a direction of axis 25. The second end cap axial pole face-accommodating wall 84 comprises two pole face windows 85A, 85B in which at least portions of the two pole faces 32A and 32B are disposed and through which at least portions of the two pole faces 32A and 32B are exposed to the rotor 26. As in the case of the top end cap 28, the provision of the two pole faces windows 85 may cause the second end cap axial pole face-accommodating wall 84 to be viewed as separate walls, for which reason the second end cap axial pole face-accommodating wall 84 is sometimes referred to as second end cap axial pole face-accommodating wall(s) 84.

The second end cap axial pole face-accommodating wall(s) 84 provides second end cap pole face alignment features 86. The second end cap pole face alignment features 86A1 and 86A2 serve to align the pole face 32A in the pole face window 85A; the second end cap pole face alignment features 86B1 and 86B2 serve to align and locate the pole face 32B in pole face window 85B. The face alignment features 86A2 and 86B2 comprise notches or grooves which catch or retain an axially-extending first edge of the respective pole face 32A, 32B. Like for the top end cap 28, each second end cap pole face alignment features 86A2 and 86B2 comprises a quasi "V" shaped notch, with one leg of the V being oriented to abut a lateral surface of core segment 35 and another leg of the V being configured as a semi-cylindrical surface to catch a first axial edge of the pole face 32. An end of the semi-cylindrical V shaped surface forms a first axial boundary for the pole face window 85A. The face alignment features 86A1 and 86B1, on the other hand, comprise shoulders against which axially-extending second or opposite edges of the respective pole face 32A, 32B may abut, and form a second axial boundary for the pole face windows 85A, 85B. The second end cap pole face alignment features 86 are positioned and configured to align the two pole faces 32A, 32B with the aperture 82 in the second end cap cover wall 80, and as such also serve to self-align the two pole faces 32A, 32B with an outer diameter of the rotor 26, e.g., with the faces 54 of the lobes 52.

As with top end cap 28, the second end cap axial pole face-accommodating wall(s) 84 also provides other features beyond the pole face alignment features 86, including end-of-travel stop surfaces 88. One of end-of-travel stop surface 88 for each lobe 52 of the rotor 26 is a rotor-oriented face of a projection of the second end cap axial pole face-accommodating wall 84 that is positioned to at least partially conceal an axial edge of a pole face. An essentially adjacent face of the projection that forms the end-of-travel stop surface 88 at least partially defines a second end cap pole face alignment feature 86. Both end-of-travel stop surfaces 88 for lobe 52 of the rotor 26 are configured to abut an essentially entire lateral surface of the lobe 52, e.g., a surface other than terminal and to face 54 of the lobe 52.

The bottom or second end cap 30 also comprises second end cap bearing wall 90, also known as shaft holding base 83, which extends orthogonally from the second end cap cover wall 80 in a direction of axis 25. Bearing wall 90 is cylindrical, centered about axis 25, and is essentially concentric with pole face-accommodating wall 84. The bearing wall 90 extends axially and has an inside bearing surface which is essentially flush with an inside surface of the second end cap aperture 82. Bearing wall 90 is thus at a lesser distance from axis 25 than is pole face-accommodating wall 84. An interior surface of bearing wall 90 provides a shaft radial bearing surface.

The top end cap 28 and bottom end cap 30 thus have comparable features that become aligned upon assembly of the overall rotary solenoid 20. That is, when the shaft 24 (bearing rotor 26) is anchored in shaft holding base 83, the core 22 is fit and installed around second end cap axial pole face-accommodating wall 84, and top end cap 28 positioned over the core 22 and bottom end cap 30 (with shaft 24 extending through the top end cap 28), the internal features of top end cap 28 and bottom end cap 30 become aligned. For example, two pole face windows 85A, 85B of bottom end cap 30 cooperate with the two pole faces windows 65A, 65B, of top end cap 28 to form composite windows through which the two pole faces 32A and 32B may be oriented and retained relative to the rotor assembly 23. The core 22 becomes retained, e.g., interference fit or press fit, between bottom end cap 30 and top end cap 28. The first end cap pole face alignment features 66 and the second end cap pole face alignment features 86 become aligned, as do the end-of-travel stop surfaces 68 and end-of-travel stop surfaces 88 of the respective end caps 28 and 30, and cooperate for form composite alignment features which work in unison to achieve their intended purposes, e.g., including the purpose of self-alignment.

Figure 13:
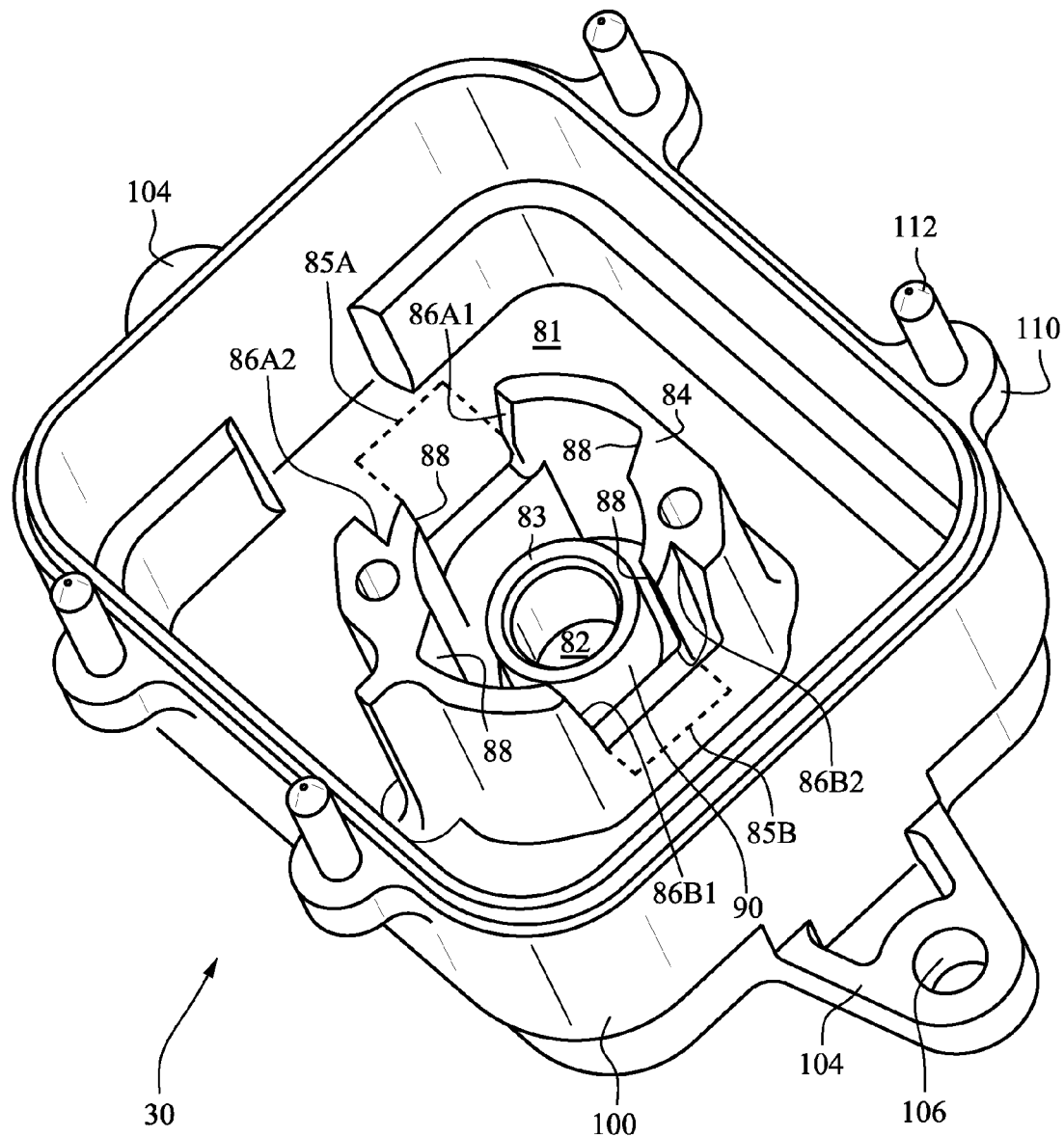
FIG. 13 is a top perspective view of a bottom end cap of the rotary solenoid of FIG. 1.
Figure 14:
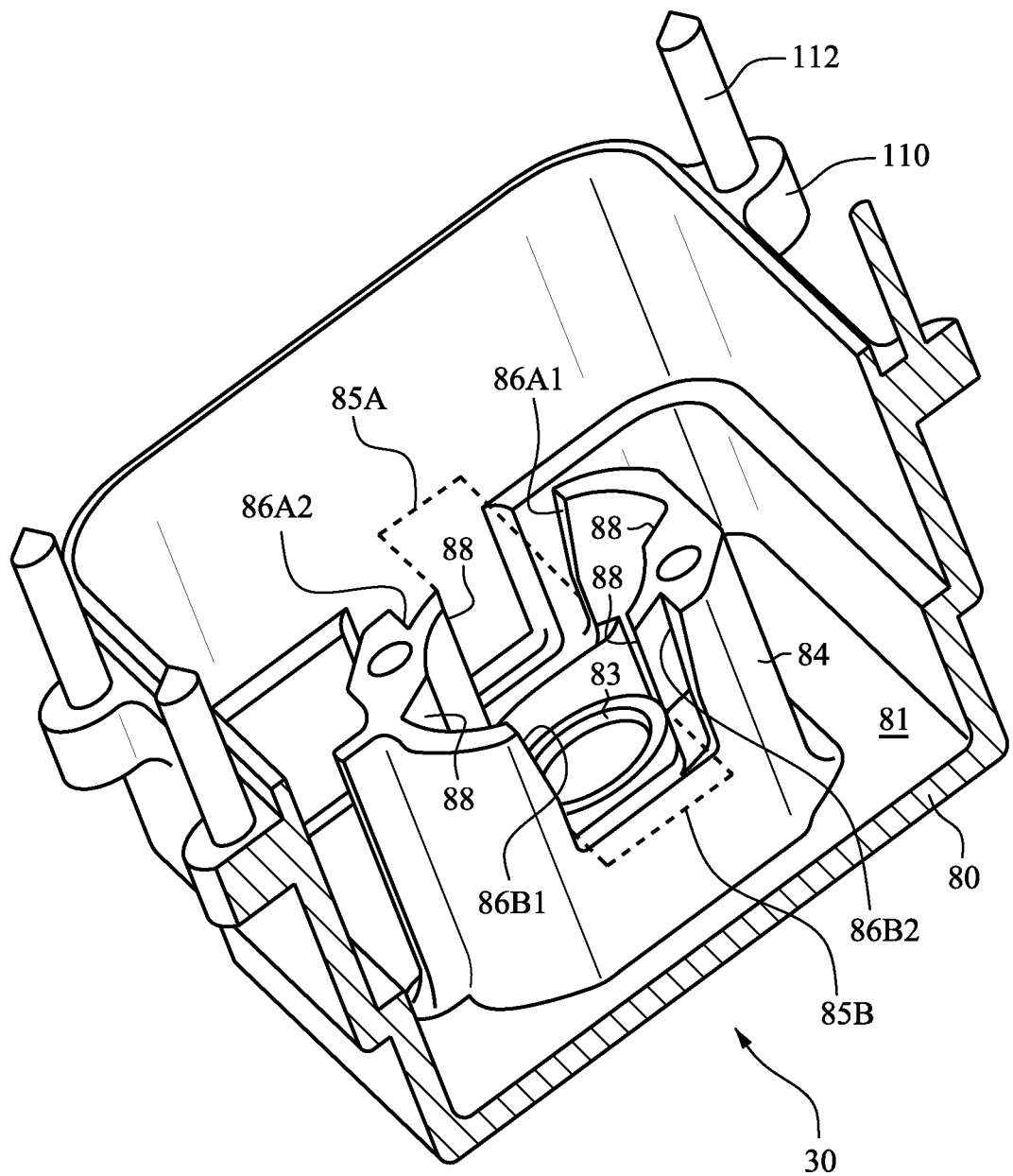
FIG. 14 is side perspective view of the bottom end cap of FIG. 13, with a portion of the bottom end cap cut away to reveal bottom end cap internal structure.

As further shown in, e.g., FIG. 13, the bottom end cap 30 comprises an axially extending peripheral wall or shell 100 that defines a core-containment space or volume. Near its intersection with second end cap cover wall 80 the axially extending peripheral wall 100 comprises two solenoid attachment flanges 104 positioned at 180 degree angles about the axis 25. The solenoid attachment flanges 104 each carry solenoid attachment apertures 106 through which fasteners 108 or the like may attach the rotary solenoid 20 to environmental support or utilization structure. Near its top or distal end the axially extending peripheral wall 100 of bottom end cap 30 comprises four cap closing flanges 110 formed thereon through which cap closing dowels or other fasteners 112 may extend. The top end cap 28 comprises four complementary cap closing flanges 113 which are positioned to receive the cap closing fasteners 112 when the top end cap 28 and bottom end cap 30 are aligned with the shaft 24 extending therethrough. The top end cap 28 also comprises solenoid attachment flanges 114 each carry solenoid attachment apertures 116 through which fasteners 118 or the like may attach the rotary solenoid 20 to environmental support or utilization structure.

In an example embodiment, at least one of the two end caps (e.g., top end cap 28 and bottom end cap 30) comprises a plastic material and the aperture 62, 82 of the at least one end cap 28, 30, respectively, serves as a plastic bearing for the shaft. For example, for one or both of the top end cap 28 and bottom end cap 30, the cover wall and the axial wall may be integrally formed of plastic. Any plastic is suitable in this regard that has low coefficient of friction, such as (for example) acetals (both homopolymer and copolymer) with tradenames such as Delrin®, Celcon®, Ultraform®, Duracon®, etc.

Figure 19:
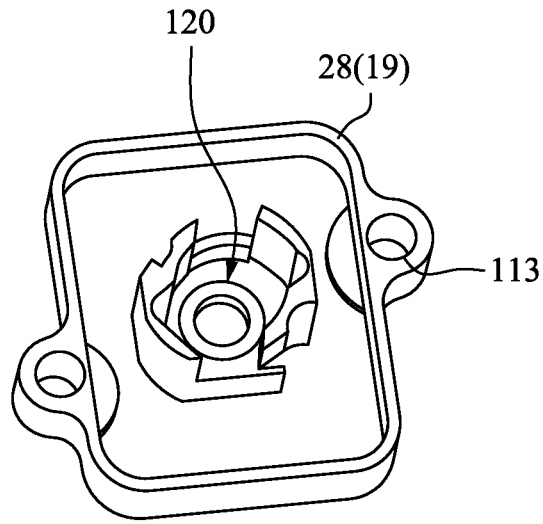
FIG. 19 is a perspective bottom view of a top end cap of the rotary solenoid of FIG. 1 according to an example variation embodiment.

In another example embodiment, illustrated in FIG. 19 with reference to top end cap 28(19), one or both of the top end cap and the bottom end cap may, at the location of the respective aperture, comprise a channel or other means for accommodating ball bearings 120 to support the shaft. In other words, the integral plastic bearings in both end caps are replaced with ball bearings to support the shaft. This adaptation can be easily accomplished by molding a bearing pocket into the plastic or die cast end cap that receives the bearing as shown in FIG. 19. The bearing pocket does not disrupt the critical features molded into the end cap that locate the core.

FIG. 19 also illustrates that the complementary cap closing flanges 113 may be formed in different number and different locations in other embodiments. In an example embodiment, fasteners may be inserted through hollow rivets or eyelets provided on flanges or elsewhere on the solenoid body to mount the solenoid to a host or utilization device.

Figure 20:
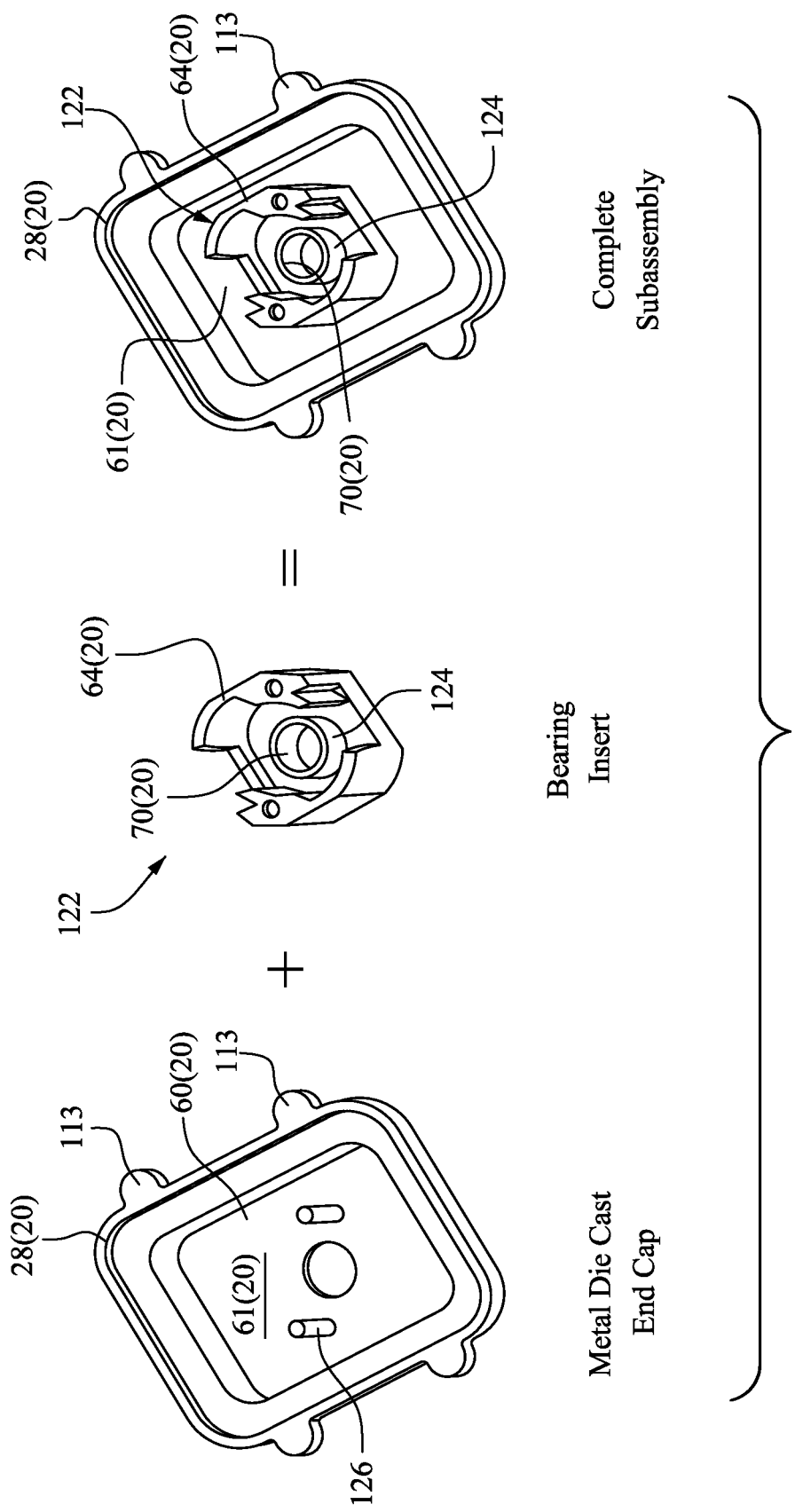
FIG. 20 is a perspective bottom view of method of assembly of a top end cap of the rotary solenoid of FIG. 1 according to another example variation embodiment.
Figure 20A:
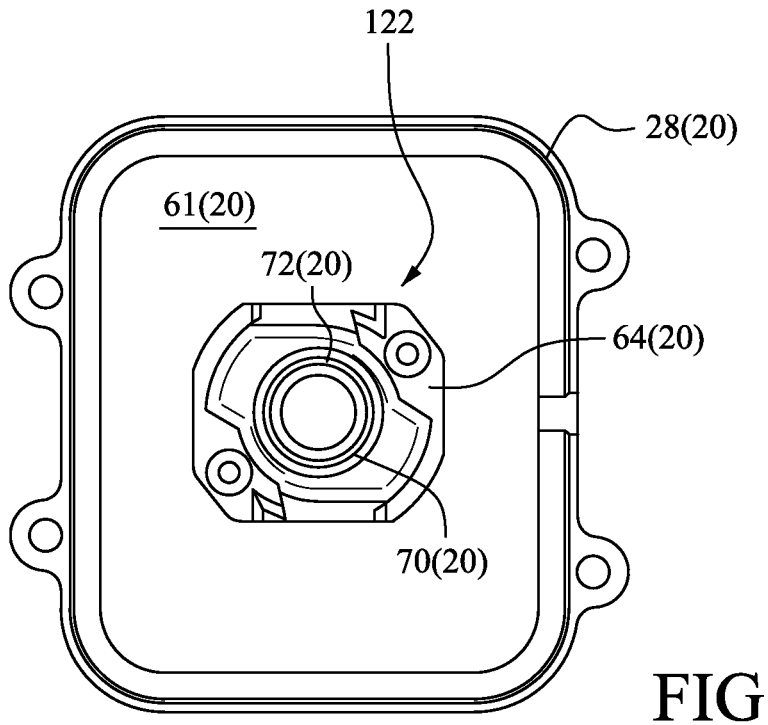
FIG. 20A is a bottom view of the assembled end cap of FIG. 20.
Figure 20B:
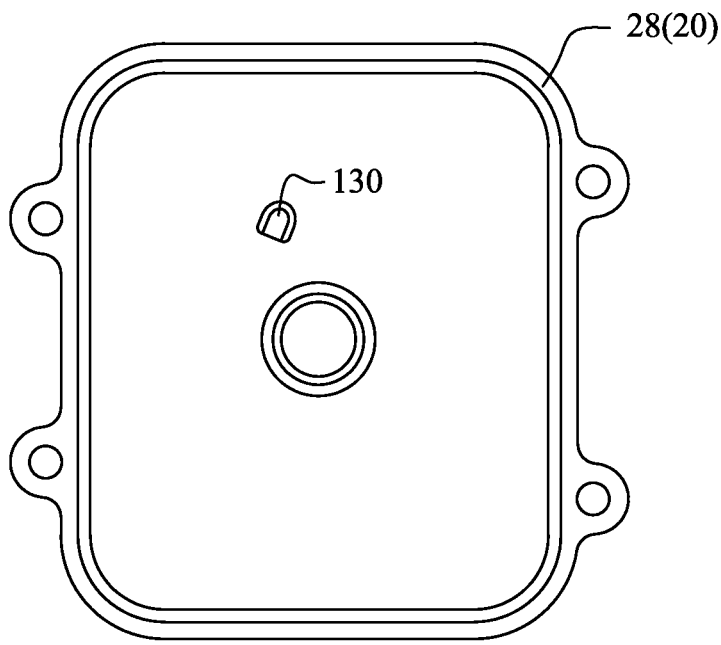
FIG. 20B is a top view of the assembled end cap of FIG. 20.
Figure 20C:
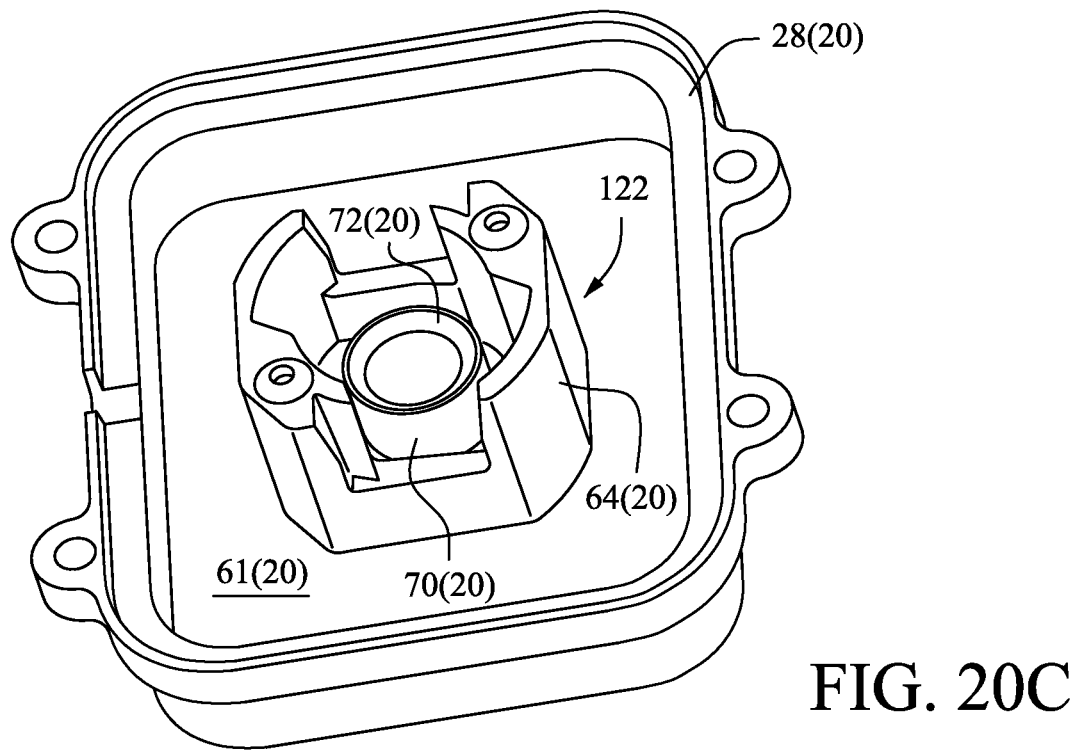
FIG. 20C is a perspective side bottom view of the assembled end cap of FIG. 20.
Figure 20D:
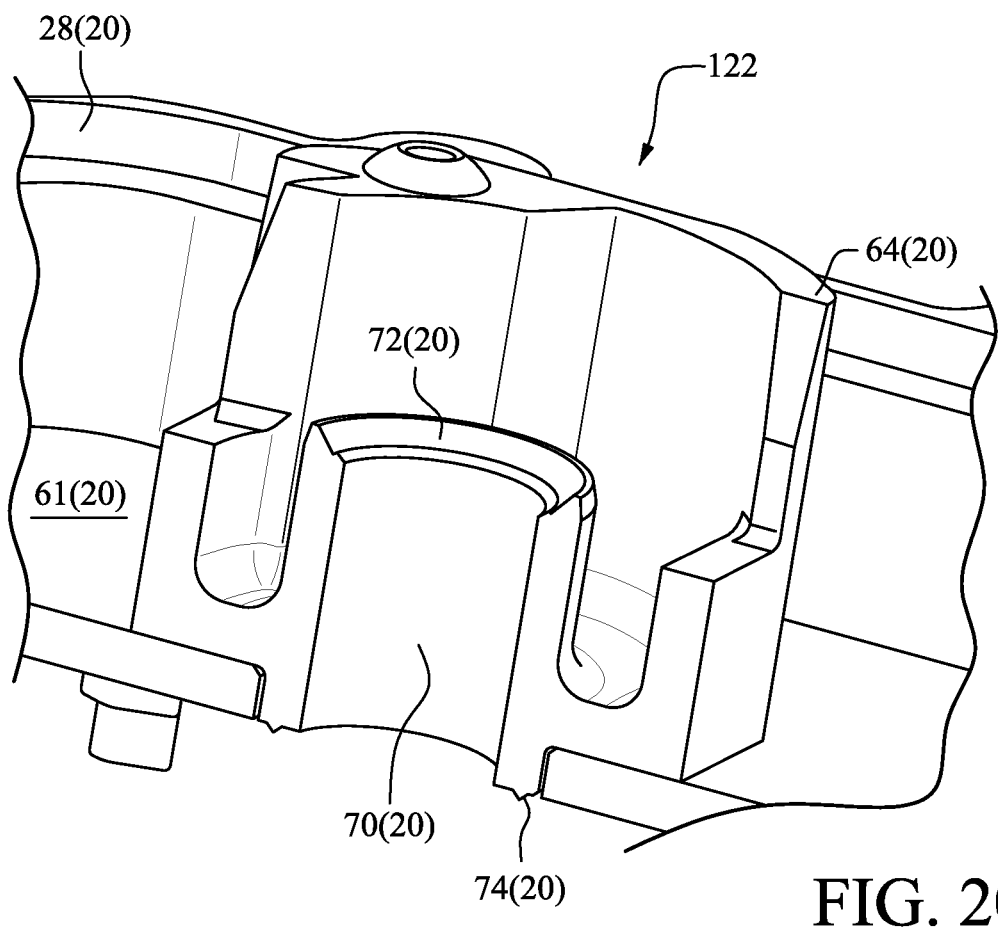
FIG. 20D is a sectioned perspective side bottom view of the assembled end cap of FIG. 20.

In yet another example embodiment, illustrated in FIG. 20 and FIG. 20A-FIG. 20D with reference to top end cap 28(20), one or both of the top end cap and the bottom end cap may have its cover wall (represented by cover wall 60(20) in FIG. 20) constructed to comprise metallic material for heat dissipation purposes. In the FIG. 20 embodiment, bearing insert 122, preferably comprised of plastic, attaches to interior surface 61(20) of the cover member 60(20). The bearing insert 122 serves to provide pole face-accommodating wall 64(20) and bearing wall 70(20), similar to comparably numbered elements of other embodiments and attaches to interior surface 61(20) of the cover member 60(20). The plastic bearing insert 122 that serves as the axial pole face-accommodating wall comprises an essentially hollow cylindrical collar 124, an interior axial wall of which provides a bearing wall 70(20) for the shaft 24. The attachment of the plastic bearing insert 122, that serves as the axial pole face-accommodating wall 64(20) to the interior surface 61(20) may be through dowels or fasteners 126 that extend axially from the interior surface 61(20) and fit into complementary channels in the plastic bearing insert 122 that serves as the axial pole face-accommodating wall. FIG. 20D additionally shows a rotor ring bearing thrust surface 72(20) when the end cap is a top or first end cap. As indicated before, the rotor ring bearing thrust surface 72(20) engages the surface 73 of a terminal end of the rotor and prevents the rotor assembly from moving too far in the axial direction. FIG. 20D also shows a spring retainer thrust ring surface 74(20) of bearing wall 70(20). The spring retainer thrust ring surface 74(20) contacts the underside of spring retainer or spring holder 134. The spring retainer 134 is pressed onto the shaft 24. An underside surface of spring retainer 134 contacts the spring retainer thrust ring surface 74(20) if necessary during operation. The spring retainer thrust ring surface 74(20) thereby prevents excessive travel of the shaft/rotor assembly in the other direction along the axis of rotation. The spring retainer thrust ring surface 74(20) is visible in the cross section of FIG. 20D as two small "triangles" pointing downward.

Metal components conduct heat more effectively to their mounting surface which acts as a heat sink. The power rating for all-metal rotary solenoids is higher than the power rating for units made with plastic end caps. When such higher ratings are desired, as illustrated in FIG. 20 the base solenoid design can easily be upgraded to have metal end caps that dramatically improve the heat transfer of the unit to its mounting surface and thus increase its power rating. Although a die cast metal end cap would improve heat transfer, it would provide a very poor bearing surface for the shaft. This drawback is easily overcome by adding the bearing insert 122 into each die cast end cap that provides all of the alignment, bearing and end-of-travel stop features described hereinbefore. The bearing insert 122 also has room to incorporate the ball bearing should a customer want a higher power and longer life unit.

Figure 5:
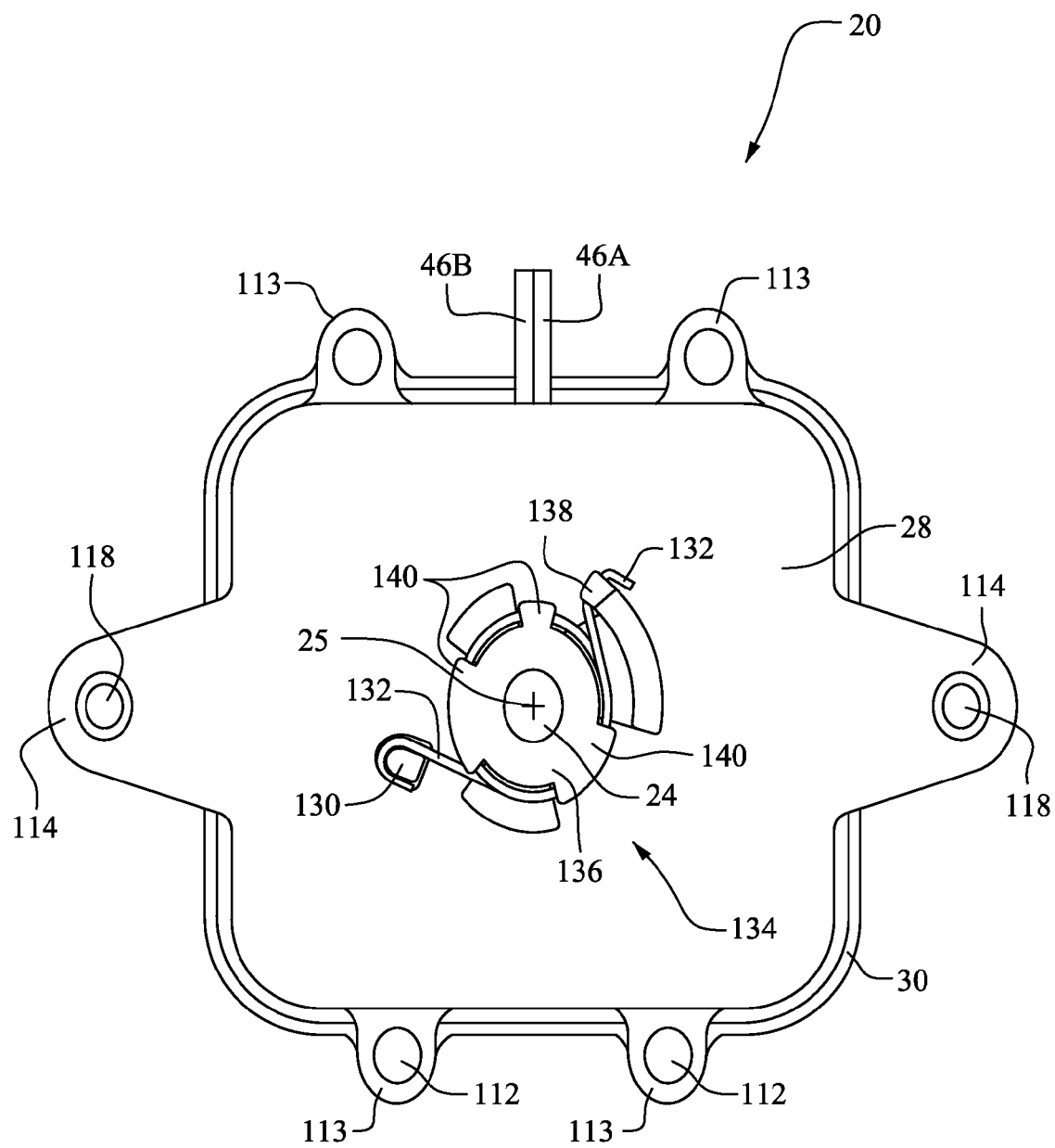
FIG. 5 is a top view of the rotary solenoid of FIG. 2.
Figure 18:
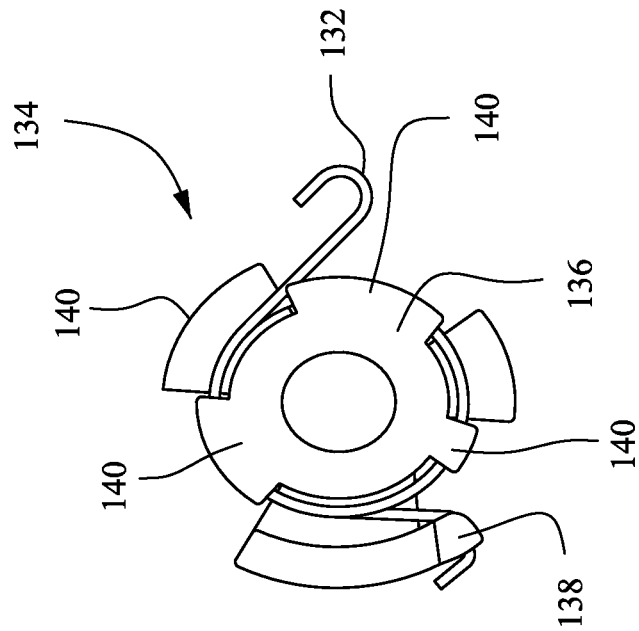
FIG. 18 is a top perspective view of the spring holder of FIG. 17.
Figure 17:
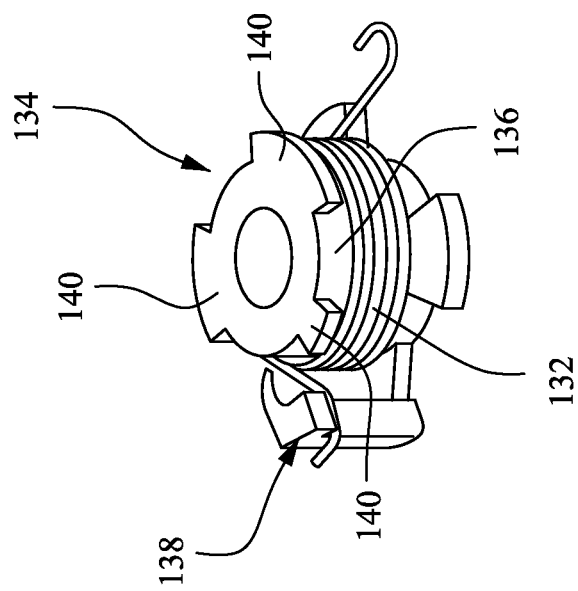
FIG. 17 is a side perspective view of a spring holder and torsion spring which comprises the rotary solenoid of FIG. 1.

One of the two end caps 28 and 30, preferably top end cap 28, comprises a spring anchor 130. For example, the spring anchor 130 may be a pin or protrusion formed on an external surface of cap cover wall 60, as illustrated in FIG. 5 and FIG. 6, for example. A first end of torsion spring 132 is configured for engagement with spring anchor 130. A spring holder 134, shown, e.g., in FIG. 17 and FIG. 18, is attached to the shaft 24 where the shaft 24 protrudes from the aperture 62 of top end cap 28. The spring holder 134 is pressed onto a knurl on the shaft 24 so that the spring holder 134 rotates with the shaft 24. The spring holder 134 comprises a spring holder body 136 about which a coil of the torsion spring 132 makes at least one turn. The spring holder 134 further comprises a spring holder set point 138 for retaining a second end of torsion spring 132. The spring holder body 136 is configured with one or more enlarged lobes 140 to preclude removal of the torsion spring 132 along a direction of the shaft axis 25 after the torsion spring 132 is set. In the illustrated example embodiment, three such enlarged lobes 140 are provided.

The torsion spring 132 is configured to return the shaft 24 to a home position when the two magnetic poles are not energized. The torsion spring 132 comprises a spring coil which terminates in a torsion spring first end which engages the spring anchor 130, and a torsion spring second end which is retained by spring holder set point 138.

Various aspects and features of the embodiments described above will now be elaborated and/or emphasized. A first such example aspect concerns a method or process of fabricating the core 22. Typical radial air gap rotary solenoids have a one-piece core which may be made from a lamination stack or fabricated from a solid piece of metal. The typical core's inner circular opening through which the rotor rotates varies dimensionally with each core due to fabrication techniques and can be a source of tolerance stack concerns as well as lead to performance variation due to air gap variations. By contrast, the two-piece slip joint core 22 of the technology disclosed herein eliminates these prior art problems and issues by forming the core 22 from two mating half core members 22A and 22B, and aligning the two mating half core members 22A and 22B with rotor assembly 23.

Figure 21:
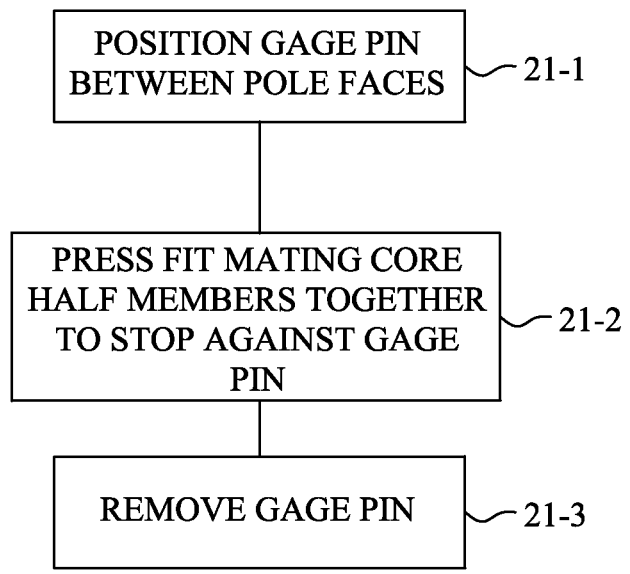
FIG. 21 is a flowchart showing example, representative selected acts or steps according to an example method or process of assembly of core fabrication of a rotary solenoid.

In the above regard, FIG. 21 illustrates example, representative acts or steps according to an example method/process of core fabrication. Act 21-1 comprises inserting a precision diameter gage pin between the two pole faces 32A and 32B of the two core halves 22A, 22B, respectively. Act 21-2 comprises pressing together two core halves (22A, 22B, essentially identical parts) in a predetermined dimension/direction as shown by the "press force" arrows in FIG. 9. As the two core halves 22A, 22B are pressed together, their two slip joint geometries are aligned (e.g., tongues 42 are press fit into grooves 40). The core halves are then pressed to a positive stop against the precision gage pin diameter. The press fits of the two slip joints hold the two core halves 22A, 22B together. When the precision gage pin is removed (act 21-3), a single and very repeatable dimension for the distance between the core half pole faces 32A, 32B has been achieved. This operation is repeatable for all cores as they are assembled, thus eliminating the tolerance stack concerns noted earlier. A secondary benefit of the pressing operation, which requires several hundred pounds of force, is that (e.g., as a result of the force) any surface irregularities such as high spots on the pole face of each core half are now "smoothed" over resulting in a very consistent pole face radial geometry for the air gap (to exist between the pole face and the rotor 26) which enhances solenoid performance repeatability.

Figure 21A:
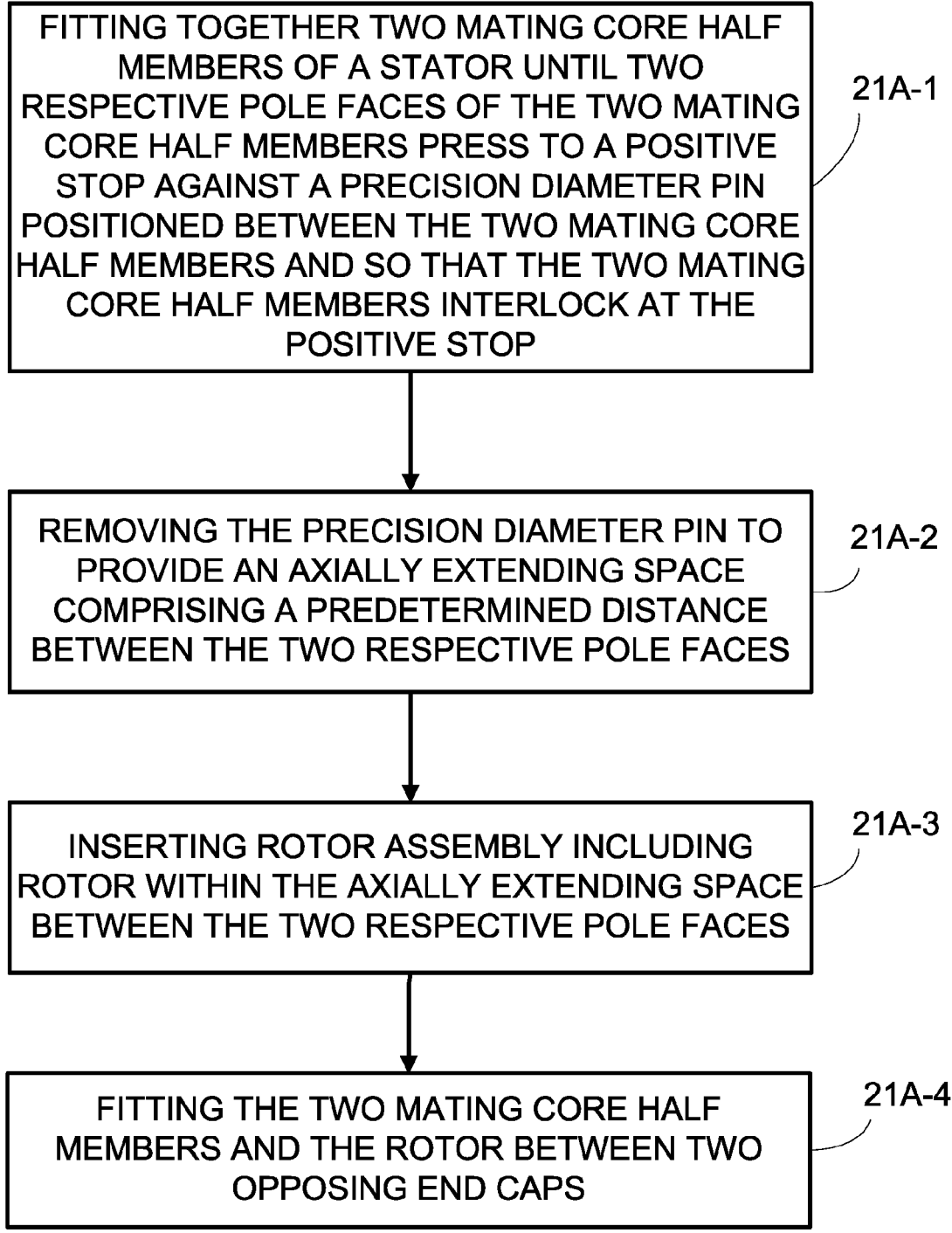
FIG. 21A is flowchart showing a method or process of making a rotary solenoid including the acts of FIG. 21.

FIG. 21A illustrates an example process of rotary solenoid assembly including core fabrication, including example acts of FIG. 21 in conjunction with other acts elsewhere described herein. Act 21A-1 comprises performance of acts 21-1 and act 21-2 and as such comprises fitting together two mating core half members 22A, 22B of a stator until two respective pole faces 32A, 32B of the two mating core half members press to a positive stop against a precision diameter pin positioned between the two mating core half members and so that the two mating core half members interlock at the positive stop. Act 21A-2 (like act 21-3) comprises removing the precision diameter pin to provide an axially extending space comprising a predetermined distance between the two respective pole faces 32A, 32B. Act 21A-3 comprises pressing the stator assembly (comprising the two mating core half members 22A, 22B) into the top end cap 20. In so doing, the first end cap pole face alignment features 66A1 and 66A2 serve to align the pole face 32A in pole face window 65A and first end cap pole face alignment features 66B1 and 66B2 serve to align and locate the pole face 32B in pole face window 65B. Act 21A-4 comprises inserting rotor assembly 23 including rotor 26 within the axially extending space between the two respective pole faces 32A, 32B and through the first end cap aperture 62. The shaft 24 of the rotor assembly 26 is thus located in the bearing wall 70 of the top end cap 20 and held in place while subsequent acts are performed. For an example embodiment in which spring holder 134 is utilized, act 21A-5 comprises fitting or pressing the spring holder 134 on the top end of rotor shaft 24 as the top end of the rotor shaft protrudes through first end cap aperture 62. When utilized, the spring holder 134 provides accurate and final axial positioning of rotor assembly 26. Act 21A-6 comprises attaching the bottom end cap 30 to the stator assembly (e.g., the two mating core half members 22A, 22B). As the bottom end cap 30 fits onto the stator assembly, the bottom end cap pole face alignment features 86A1 and 86A2 serve to align the pole face 32A in the pole face window 85A; the bottom end cap pole face alignment features 86B1 and 86B2 serve to align and locate the pole face 32B in pole face window 85B. At this point the two mating core half members 22A, 22B and at least a portion of the rotor 23 are accurately axially positioned between two opposing end caps 20, 30, with the bottom of rotor assembly 23 positioned in shaft holding base 83 and being rotatable in the axially extending space between the two mating core half members 22A, 22B. The two pole faces with pole face alignment features provided on the two opposing end caps are aligned so that the two pole faces 32A, 32B are retained at a predetermined position relative to the rotor 26.

A second example aspect of the technology disclosed herein concerns certain features of the solenoid end caps described herein. For all rotary solenoids, the solenoid components through which the shaft exits each end of the solenoid must keep the shaft-rotor assembly concentric with the core's pole faces, regardless of the number of poles. Although the preferred core features for the end caps to locate on are the core's poles or pole faces, these features typically are not accessible due to the bobbin and windings located on the poles. As a result, current designs choose other core features such as the core's outer geometry or locating features specifically added to the core to locate both end caps and thus the shaft-rotor assembly within the core. The resulting tolerance stack from the features and components is greater than desired and leads to a larger than desired air gap to compensate for the tolerance stack. These conditions lead to reduced performance as well as performance variation as the air gap varies with each build. The tolerance stack issue is exacerbated if bearing pockets are machined into each metal end cap and bearings are pressed into those pockets to increase cycle life.

The end cap design of the technology disclosed herein resolves many of the issues just described and incorporates additional benefits as well. The end caps of the technology disclosed herein comprise features molded into each end cap that dramatically reduce the tolerance stack by locating the core directly on its pole faces rather than on non-critical core features. Since these locating features are molded in the end cap at the same time the through hole of the end cap is molded, e.g., the hole where the shaft exits the unit, all these features are molded on the same centerline, allowing the rotor to be concentric with the pole face opening set earlier with the predetermined precision gage pin. The locating features just mentioned include, for example, the pole face alignment features 66 of top end cap 28 and the pole face alignment features 86 of bottom end cap 30.

Molding the end caps 28 and 30 from a plastic material such as Delrin or other low coefficient of friction material allows the respective exit holes 62, 82 to provide a radial bearing support for the shaft 24, thus eliminating the need for a separate bearing component on each end of the unit.

Rotor thrust surface 72 and end-of-travel stops 68 may also be molded into the first end cap 28, and end-of-travel stops 88 may be molded into second end cap 30. Thus each end cap component accomplishes the following tasks: secures and positions the core 22; concentrically locates the shaft-rotor assembly 24/26 within the core 22; provides radial and (in the case of the first end cap) thrust surfaces for the shaft-rotor assembly 24/26; and, establishes a customized set of end-of-traveled stops for the rotor 26 in both directions of travel.

Typical rotary solenoids have mounting studs pressed into one end of the unit while others have tapped holes to receive threaded fasteners. In some cases, the threaded holes can be found on both end caps provided they do not interfere with the externally located return spring and its retainer or are used to locate and fasten the external end-of-travel stops. All of these approaches require metal end caps which in some cases also serve as part of the electromagnet flux path. These approaches also require secondary operations to drill, tap and/or press features, which add to the overall cost of the unit. When the mounting scheme is limited to one side of the solenoid, shaft rotation in both directions (clockwise and counterclockwise) often requires two separate bobbins with internal end-of-travel stop features located at different positions which adds cost and necessitates a second part number to be utilized that specifically identifies the direction of rotation when powered.

Figure 16:
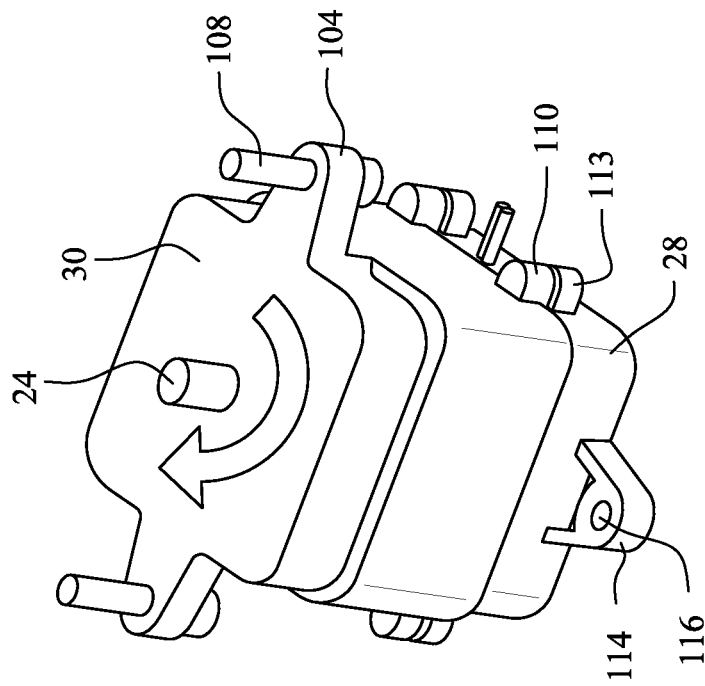
FIG. 16 is a bottom perspective view of a rotary solenoid of the type of FIG. 1, showing orientation for clockwise motion and also showing one set of mounting flanges on an end cap rotated ninety degrees relative to mounting flanges on the other end cap, as well as two fasteners.
Figure 15:
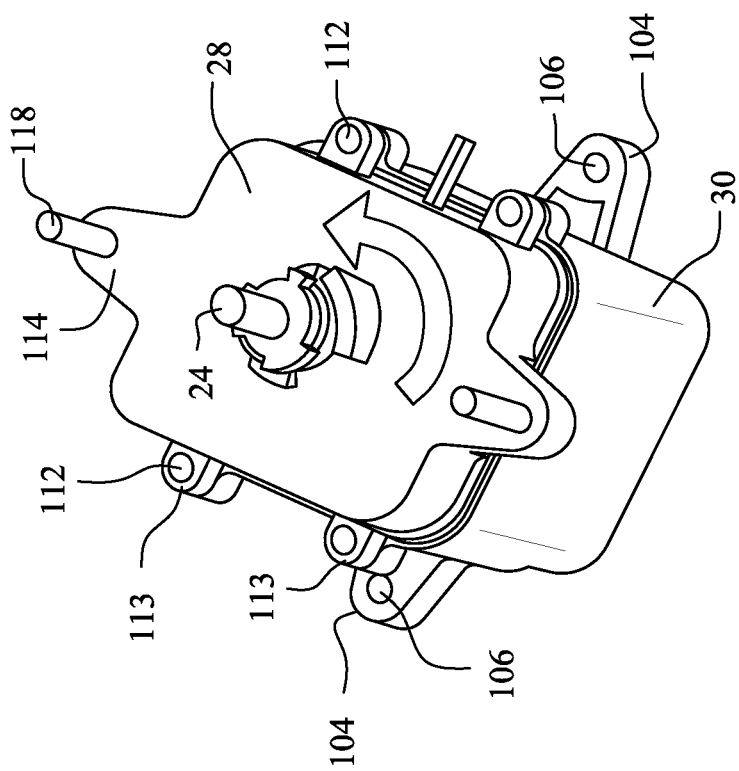
FIG. 15 is a top perspective view of a rotary solenoid of the type of FIG. 1, showing orientation for counter-clockwise motion and also showing one set of mounting flanges on an end cap rotated ninety degrees relative to mounting flanges on the other end cap, as well as two fasteners.

The mounting scheme shown in FIG. 15 and FIG. 16 demonstrates the flexibility to obtain both clockwise and counterclockwise rotary motion with one final assembly (and part number) by simply turning the part over. This approach eliminates the need for all secondary operations to drill, tap and/or press additional features on the end caps. Since neither end cap is part of the electromagnetic flux path and can be molded in either plastic or die cast metal, an unlimited number of mounting flange schemes can be incorporated in the tool for either end cap.

Another advantageous aspect of the technology disclosed herein concerns its return spring structure and operation. Typical rotary solenoids utilize a clock spring to mechanically supply the torque that returns the shaft-rotor assembly to its "home" position when power is removed from the unit. One end of the clock spring is typically retained by a feature milled on the shaft while the other end is selectively positioned on one of numerous catches on a metal spring holder anchored on the end cap. To set the clock spring, an operator must manually "clock" the spring the appropriate number of turns, set the spring on a holder catch then test the spring torque value to ensure the setting is correct. If the spring setting is not correct, the spring must be disengaged from the holder catch, adjusted to the proper catch on the spring holder and re-tested. This long and involved process adds labor time to the solenoid as well as involves costly components for both the clock spring and spring holder.

The technology disclosed herein features, e.g., spring holder 134. The spring holder 134 is molded of plastic and simply pressed onto a knurl on the shaft 24, reducing the piece cost of both the shaft 24 and spring holder 134. The plastic spring holder 134 comprises a single feature 138 to set the spring, thus eliminating the setting, testing and re-setting process that currently occurs with clock springs. Also, the winding of the standard torsion spring 132 according to the technology disclosed herein requires less than one full turn, reducing the assembly time and allowing the spring 132 to assemble easier on the spring holder. Although the torsion spring 132 was initially placed over the three lobes 140 during assembly, once the spring 132 is wound and set, the inside diameter reduces in size and therefore cannot come off the spring holder 134, i.e., the spring 132 is not only held in place but is also retained such that once it is set, it can never come off the spring holder 134.

Figure 22:
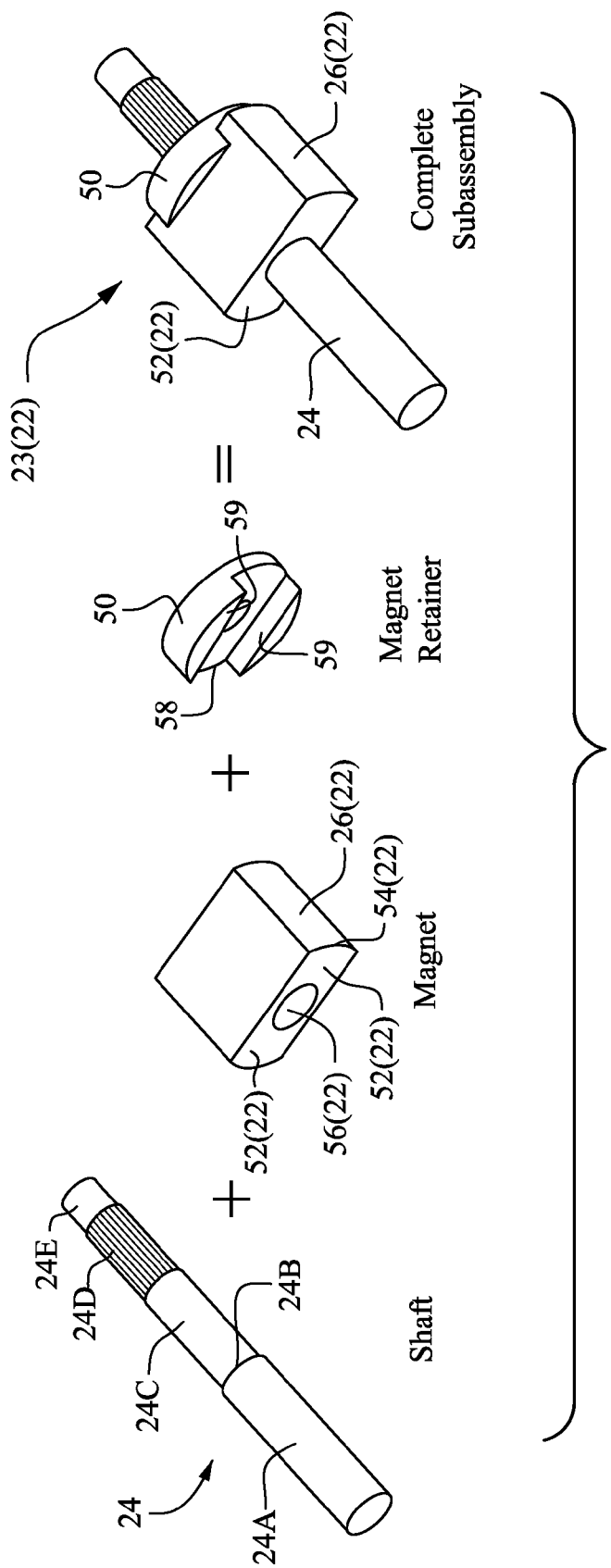
FIG. 22 is a side perspective view of a rotor assembly of the rotary solenoid wherein the rotor comprises a magnet.

The rotor assembly 23 of the basic rotary solenoid 20 rotates through a range of motion of 45 degrees. There are some applications that require rotary motion that latches in one of two states. Rotary solenoid designers have addressed this request by determining a scheme to mount a magnet to a shaft then allow the magnet to be the "rotor." In some cases, the magnet is overmolded onto the shaft whereas in other cases, a complex kluge of various components and adhesives is utilized. By contrast, FIG. 22 shows a very straightforward and cost-effective solution for affixing a magnetic rotor 26(22) to a shaft 24. In a bi-stable magnetic latching embodiment such as that shown in FIG. 22, the rotor assembly 23(22) rotates through a range of motion of 90 degrees.

The rotor assembly 23(22) of FIG. 22 comprises shaft 24; a magnetic rotor 26(22) carried by (e.g., mounted on) the shaft 24; and, magnetic rotor retainer 50. The magnetic rotor 26(22) is configured to be accommodated between the two pole faces 32A and 32B. The magnetic rotor 26(22) has two enlarged portions or rotor lobes 52(22) which are oriented at 180 degree angles with respect to one another. Terminal faces 54(22) of the lobes 52 have an essentially same semi-cylindrical configuration as do the two pole faces 32A and 32B. The shaft 24 comprises segments of differing diameter. The base of shaft 24 comprises shaft nominal diameter segment 24A. At a position 24B on shaft 24 at which magnetic rotor 26(22) is to be mounted the diameter has a stepped reduction to form shaft magnet-mounted segment 24C. The shaft 24 has yet further progressively reduced diameter portions, such as segments 24D and 24E, as shown in FIG. 22.

The magnetic rotor 26(22) has rotor central aperture 56(22) extending in the direction of axis 25 and sized to fit over the shaft magnet-mounted segment 24C, but of smaller diameter than the shaft nominal diameter segment 24A, so that the magnetic rotor 26(22) is located or seated at the stepped position 24B. The magnetic rotor retainer 50 has a generally circular or disk shape, but with a rotor-accommodating channel 58 cut through or otherwise formed on underside thereof. The magnetic rotor retainer 50 has an axial, central aperture which is press fit onto rotor shaft 24 at stepped position 24D. The rotor-accommodating channel 58 is defined by chord-like retaining shoulders 59 which depend from the underside of the 50. The rotor-accommodating channel 58 is sized and configured to fit over a top portion of the magnetic rotor 26(22), with the chord-like retaining shoulders 59 being configured to retain the magnetic rotor 26(22) on the shaft 24 so that the magnetic rotor 26(22) rotates about axis 25 in harmony with the rotation of shaft 24.

Thus, as understood from the foregoing, in an example implementation, the rotor shaft 24 comprises at least one stepped portion (e.g., 24B). The magnetic rotor 26(22) comprises the through hole or aperture 56(22) configured to receive the shaft 24 so that the magnetic rotor 26(22) abuts the shaft stepped portion 24B. The rotor retainer 50 is configured to press fit over the shaft 24 and to prevent the magnetic rotor 26(22) from angular motion relative to the shaft 24, e.g., to ensure angular rotation of the magnetic rotor 26(22) with the shaft 24 about axis 25.

The magnetic rotor 26(22) with a through hole 56(22) is placed over the shaft 24 until it contacts a step 24B in the shaft 24. The magnet retainer 50 is then pressed onto a knurl on the shaft to prevent it from rotating. When the two flat surfaces of the retaining shoulders 59 of the magnet retainer 50 engage the two flats (e.g., flat surfaces) on the magnetic rotor 26(22), the magnetic rotor 26(22) now rotates in union with the shaft rotation. FIG. 22 shows an assembly sequence which is quick and effective since it eliminates adhesives, complicated components and costly over-molding tools.

A challenge to be overcome with some two-position magnetic latching solenoid is the very high end-of-travel impact loads imparted on the unit. In some situations the plastic internal stops located in the two end caps and described previously may be replaced to better sustain end-of-travel impact forces. Accordingly, an additional end-of-travel stop mechanism may be incorporated "externally" to the unit. Some rotary solenoid designers accomplish this task by adding a rotating feature to the shaft and a metal component to the end cap that limits travel to the prescribed angle. Some even include bumpers to lessen the impact load. The metal component plus associated fasteners adds significant cost and assembly time to the solenoid.

Figure 23:
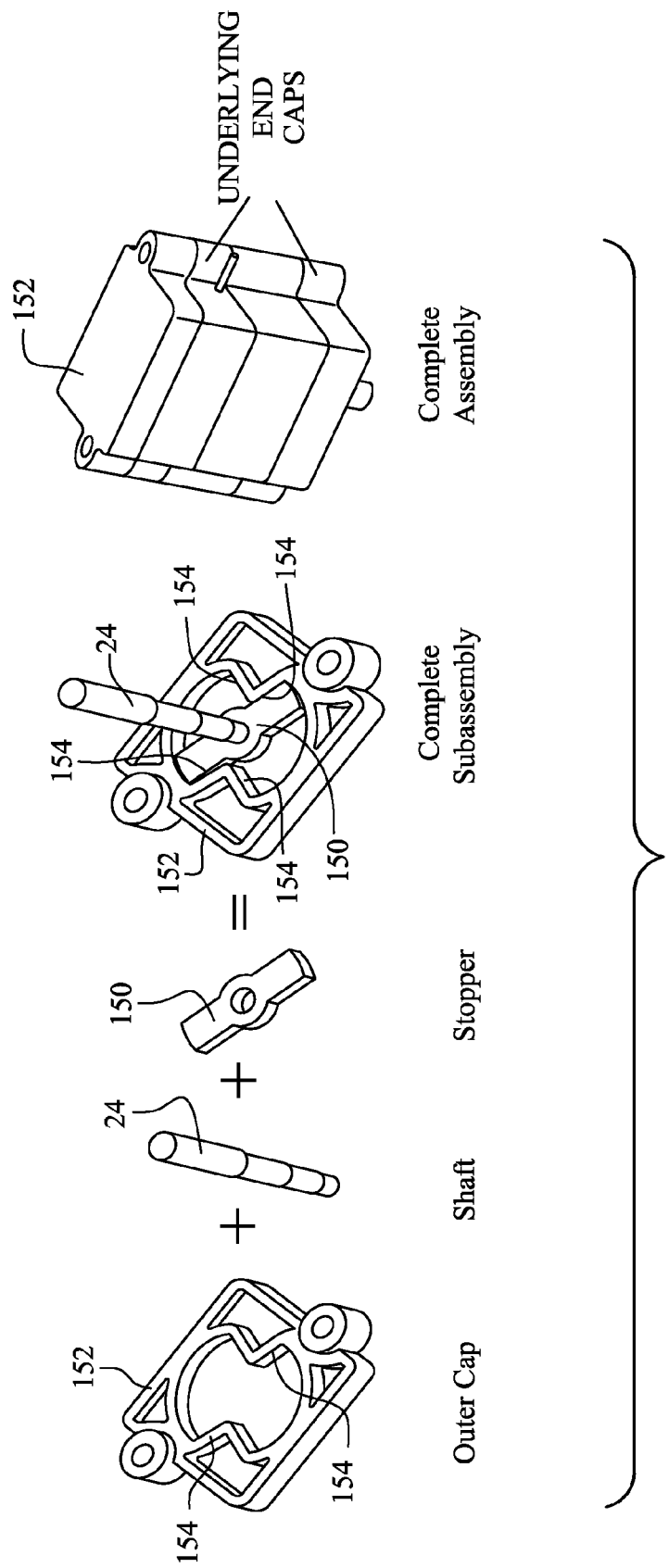
FIG. 23 is a perspective bottom view of method of assembly of a rotary solenoid which includes an outer cap or reinforcement end cap.
Figure 24B:
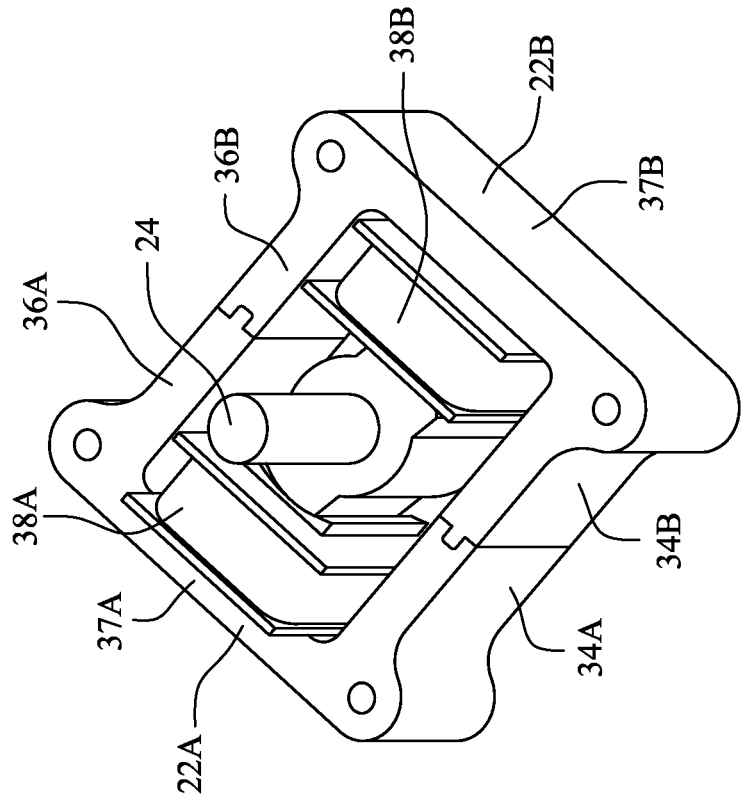
FIG. 24B is a top perspective view of a rotary solenoid of FIG. 24A with top end cap, bottom end cap, torsion spring, spring retainer and lead wires removed.
Figure 24A:
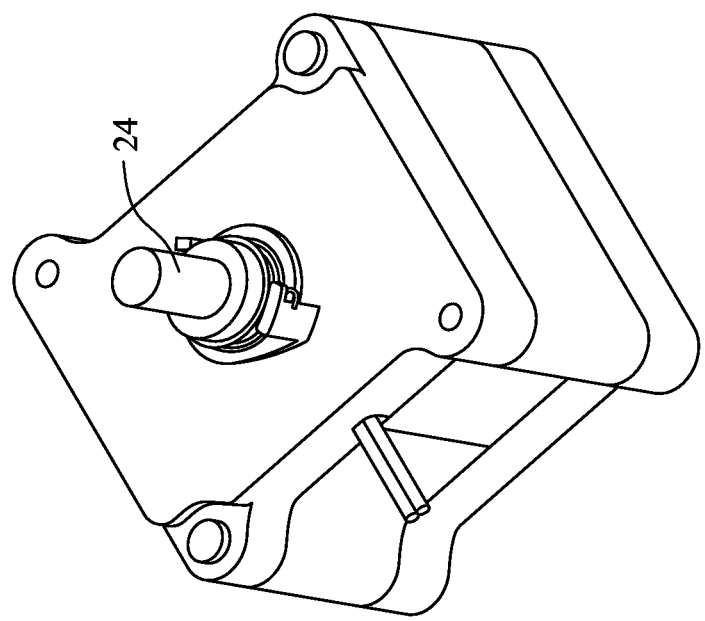
FIG. 24A is a top perspective view of a fully assembled rotary solenoid according to another example embodiment.
Figure 25:
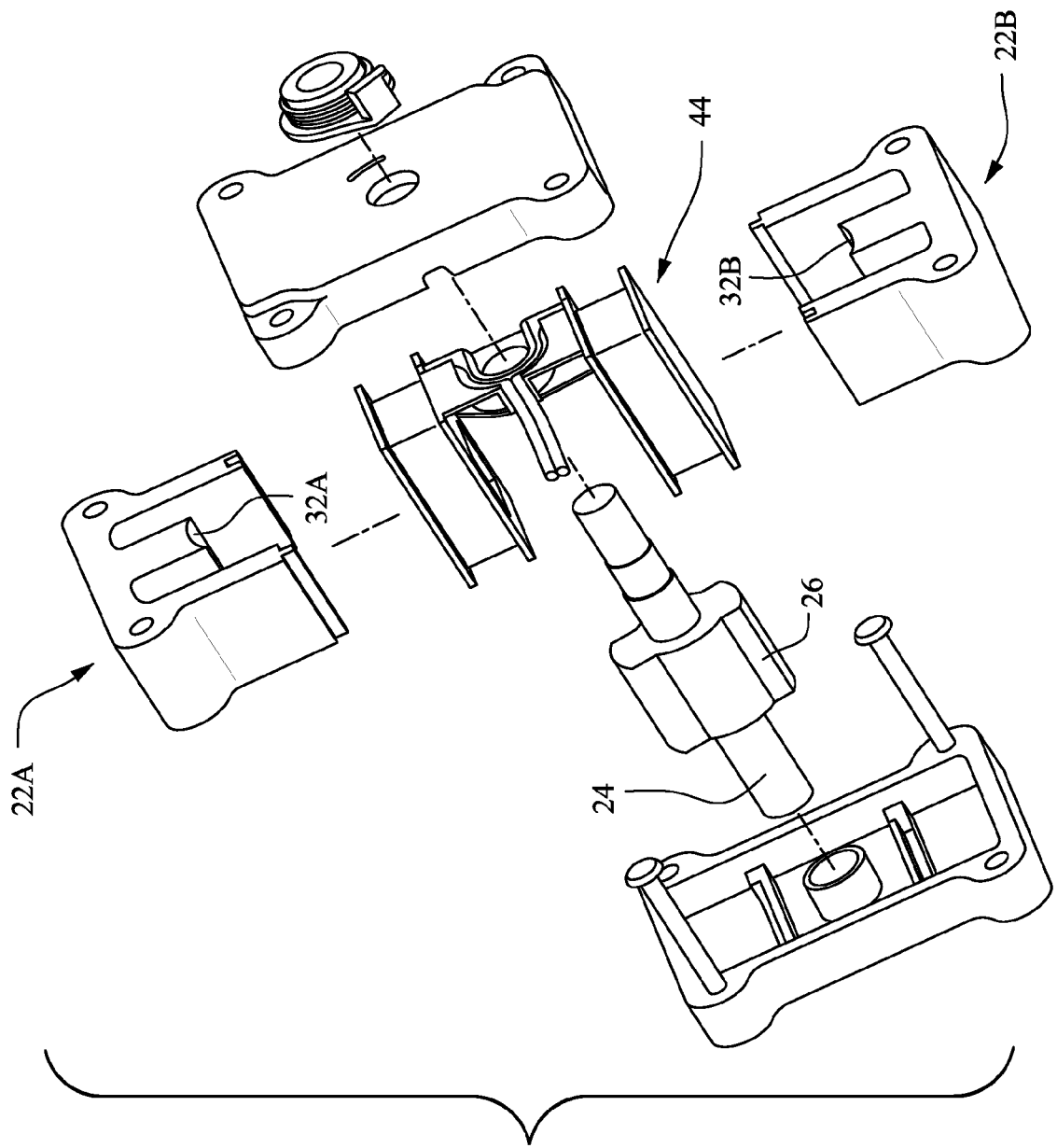
FIG. 25 is a perspective exploded view of a rotary solenoid according to an example embodiment of FIG. 24A.

FIG. 23 illustrates a rotary solenoid wherein the shaft 24 protrudes beyond at least one of the end caps (e.g., top end cap 28 and/or bottom end cap 30), and carries a stopper member 150 which rotates in unison with the rotor 26. An outer cap or reinforcement end cap 152 is provided to surmount one of the underlying end caps. The reinforcement end cap 152 defines one or more reinforcement travel stop surfaces 154 for the stopper member 150, e.g. four such reinforcement travel stop surfaces 154 being illustrated in FIG. 23.

Thus, FIG. 23 illustrates a cost-effective approach since the end-of-travel stops 154 are incorporated as part of a plastic molded outer cap. The rotating component is diametrical in nature which allows reinforcement travel stop surfaces 154 to absorb the end-of-travel impact loads, with each stop surface 154 absorbing half the impact load. The outer cap 152 may require no additional fasteners since it may be secured to the solenoid with the existing process that holds the entire unit together. The entire end-of-travel stop mechanism may be covered under the plastic outer cap 152. This protection will keep debris from accumulating on that part of the solenoid as well as provide a safety cover from someone getting their digit caught and pinched in that area during solenoid operation.

When various features of the technology disclosed herein are combined, the result is a very low-cost rotary solenoid that can be produced as a net build, i.e. there are no processes that are individually tailored for each unit, with the result that the components may simply go together as is. Should an application require longer life or higher power, features can be easily incorporated to accommodate the application. The base design is capable of being reconfigured to a two-position, magnetic latching solenoid should an application so warrant.

The technology disclosed herein also describe how the base design can be modified/upgraded to include improved bearing systems and material changes that enhance the cycle life of the base design as well as its power rating. The base rotary solenoid may also be converted to a two-position, magnetic latching solenoid with bi-directional rotation.

Advantages and benefits of the technology disclosed herein include but are not limited to the following:

Core pole faces 32A, 32B that protrude through the bobbin and locate in features that align the inner diameter of those pole faces with the hole(s) 62, 82 in the end cap(s) 28, 30, through which the shaft 24 protrudes, i.e. self-aligning the pole faces 32A, 32B with the outer diameter of the rotor 26.

Solenoid housings (or end caps, etc.) are typically made from metal to help conduct the electromagnetic flux for the unit to function. Thus where the shaft protrudes from the housing, a separate bearing is required to extend the life of the unit. With a plastic end cap design (top end cap 28 and bottom end cap 30) that does not conduct flux (since the EM flux is restricted to the core) as described in the technology disclosed herein, a plastic bearing can be integrally molded into the end cap, eliminating a part. (As shown herein, higher life-cycle units may be achieved by inserting a radial ball bearing into the end cap but this is a standard process.)

The plastic spring retainer or spring holder 134 has an inherent ability to retain (as well as hold) the spring 132. The spring 132 easily fits over the lobes 140 of the spring retainer 134, but once the spring 132 is set by clocking the spring 132 to its set load point, the inner diameter of the spring 132 is now smaller that the outer diameter of the spring retainer lobes 140, so the spring could never come off during the life of the product.

Typically to retain magnets on shafts, the magnet is overmolded in plastic or glued in place since press fitting a magnet on a shaft could result in a cracked magnet. As one aspect of the technology disclosed herein the magnetic rotor 26(22) is secured to a step on the shaft 24 using plastic press fit magnet retainer 50.

The slip-fit, tongue and groove nature of each core half combined with a pressing dimension established by a removable precision gage pin eliminates tolerance stack-up issues with dimensions. When the core pole faces are seated in the plastic locating features, an automatic alignment to the bearing through hole is established.

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A rotary solenoid comprising:
a core comprising two electromagnet poles which terminate in two respective pole faces;
a shaft;
a rotor mounted on the shaft;
two end caps mounted to the core and between which the shaft extends for rotational motion relative to the pole faces in accordance with energization of the two electromagnetic poles; wherein at least one of the end caps comprises:
a cover member comprising an aperture through which the shaft extends;
an axial wall which extends from the cover member in a direction of a shaft axis and which is configured to provide a feature which aligns the two pole faces with the aperture in the cover member for self-aligning the two pole faces with an outer diameter of the rotor.

2. The rotary solenoid of claim 1, further comprising a first end cap and a second end cap;
wherein the first end cap comprises:
a first end cap cover member comprising a first end cap aperture through which the shaft extends;
a first end cap axial wall which extends from the first end cap cover member in a direction of a shaft axis and which is configured:
to provide a first end cap feature which aligns the two pole faces with the aperture in the first end cap cover member for self-aligning the two pole faces with an outer diameter of the rotor; and
to provide both an end-of-travel stop surface for the rotor and a bearing surface for the shaft;
wherein the second end cap comprises:
a second end cap cover member comprising a second end cap aperture through which the shaft extends;
a second end cap axial wall which extends from the second end cap cover member in a direction of a shaft axis and which is configured:
to provide a second end cap feature which aligns the two pole faces with the aperture in the second send cap cover member for self-aligning the two pole faces with an outer diameter of the rotor; and
to provide both an end-of-travel stop surface for the rotor and a bearing surface for the shaft.

3. The rotary solenoid of claim 2, wherein the first end cap feature which aligns the two pole faces with the aperture in the first end cap cover member and the second end cap feature which aligns the two pole faces with the aperture in the second send cap cover member form windows in which at least portions of the two pole faces are disposed and through which at least portions of the two pole faces are exposed to the rotor.

4. The rotary solenoid of claim 1, wherein at least one of the two end caps comprises a plastic material and wherein the aperture of the at least one end cap serves as a plastic bearing for the shaft.

5. The rotary solenoid of claim 1, wherein at least one of the end caps comprises a channel formed to accommodate ball bearings to support the shaft.

6. The rotary solenoid of claim 1, wherein the cover member and the wall are integrally formed of plastic.

7. The rotary solenoid of claim 1, wherein the cover member is metallic and the wall comprises a plastic wall insert member that attaches to an interior surface of the cover member, the plastic wall insert comprising a second aperture which provides a bearing surface for the shaft and thrust ring surfaces for the rotor.

8. A rotary solenoid comprising:
a core comprising two electromagnet poles which terminate in two respective pole faces;
a shaft;
a rotor mounted on the shaft;
two end caps mounted to the core and between which the shaft extends for rotational motion relative to the pole faces in accordance with energization of the two electromagnetic poles; wherein at least one of the end caps comprises:
a cover member comprising an aperture through which the shaft extends;
an axial wall which extends from the cover member in a direction of a shaft axis and which is configured to provide an end-of-travel stop surface for the rotor.

9. The rotary solenoid of claim 8, wherein the axial wall provides two end-of-travel stop surfaces for the rotor.

10. The rotary solenoid of claim 8, wherein the axial wall is further configured to provide an end-of-travel stop surface for the rotor and a bearing surface for the shaft.

11. The rotary solenoid of claim 8, further comprising a first end cap and a second end cap;
wherein the first end cap comprises:
a first end cap cover member comprising a first end cap aperture through which the shaft extends;

a first end cap axial wall which extends from the first end cap cover member in a direction of a shaft axis and which is configured:
to provide a first end cap feature which aligns the two pole faces with the aperture in the first send cap cover member for self-aligning the two pole faces with an outer diameter of the rotor; and
to provide both an end-of-travel stop surface for the rotor and a bearing surface for the shaft;
wherein the second end cap comprises:
a second end cap cover member comprising a second end cap aperture through which the shaft extends;
a second end cap axial wall which extends from the second end cap cover member in a direction of a shaft axis and which is configured:
to provide a second end cap feature which aligns the two pole faces with the aperture in the second send cap cover member for self-aligning the two pole faces with an outer diameter of the rotor; and
to provide both an end-of-travel stop surface for the rotor and a bearing surface for the shaft.

12. The rotary solenoid of claim 8, wherein at least one of the two end caps comprises a plastic material and wherein the aperture of the at least one end cap serves as a plastic bearing for the shaft.

13. The rotary solenoid of claim 8, wherein at least one of the end caps comprises a channel formed to accommodate ball bearings to support the shaft.

14. The rotary solenoid of claim 8, wherein the cover member and the wall are integrally formed of plastic.

15. The rotary solenoid of claim 8, wherein the cover member is metallic and the wall comprises a plastic wall insert member that attaches to an interior surface of the cover member, the plastic wall insert comprising a second aperture which provides a bearing surface for the shaft and thrust ring surfaces for the rotor.

16. A rotary solenoid comprising:
a core comprising two electromagnet poles which terminate in two respective pole faces;
a shaft;
a rotor mounted to the shaft;
two end caps mounted to the core and between which the shaft extends for rotational motion relative to the pole faces in accordance with energization of the two electromagnetic poles, one of the two end caps comprising an anchor feature;
a torsion spring configured to return the shaft to a home position when the two magnetic poles are not energized, the torsion spring comprising a coil which terminates in a torsion spring first end and a torsion spring second end, the torsion spring first end being configured for engagement with the anchor feature;
a spring holder attached to the shaft, the spring holder comprising a holder body about which the coil of the torsion spring makes at least one turn, the spring holder further comprising a set point for retaining the torsion spring second end, the spring holder body being configured with at least one enlarged lobe to preclude removal of the torsion spring along a direction of the shaft axis after the torsion spring is set.

17. A rotary solenoid comprising:
a core comprising two electromagnet poles which terminate in two respective pole faces;
a rotor assembly comprising:
a shaft comprising a stepped portion;
a magnetic rotor carried by the shaft and configured to be accommodated between the two pole faces, the magnetic rotor comprising a through hole configured to receive the shaft so that the magnetic rotor abuts the shaft stepped portion;
a retainer configured to retain the magnetic rotor on the shaft, the retainer being configured to fit over the shaft and to prevent the magnetic rotor from angular motion relative to the shaft;
two end caps mounted to the core and between which the shaft extends for rotational motion relative to the pole faces in accordance with energization of the two electromagnetic poles.

18. The rotary solenoid of claim 17, wherein the retainer comprises:
an axial, central aperture configured to be press-fit onto the rotor shaft;
a rotor-accommodating channel formed on an underside thereof and configured to fit over a portion of the magnetic rotor.

19. The rotary solenoid of claim 18, wherein the axial, central aperture of the retainer is configured to be press-fit onto a second stepped portion of the rotor shaft.

20. The rotary solenoid of claim 19, wherein the second stepped portion of the rotor shaft is knurled.

21. The rotary solenoid of claim 18, wherein the rotor-accommodating channel is formed between two chord-like shoulders formed on an underside of the retainer.

* * * * *